United States Patent
Nakama

(10) Patent No.: US 9,513,715 B2
(45) Date of Patent: Dec. 6, 2016

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Motoki Nakama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 14/464,436

(22) Filed: Aug. 20, 2014

(65) Prior Publication Data

US 2015/0054735 A1    Feb. 26, 2015

(30) Foreign Application Priority Data

Aug. 26, 2013 (JP) .................................. 2013-174678

(51) Int. Cl.
| | | |
|---|---|---|
| G06F 3/041 | (2006.01) | |
| G06F 3/03 | (2006.01) | |
| G06F 3/0354 | (2013.01) | |
| G06F 3/0346 | (2013.01) | |

(52) U.S. Cl.
CPC ......... *G06F 3/0325* (2013.01); *G06F 3/03545* (2013.01); *G06F 3/03547* (2013.01); *G06F 2203/04101* (2013.01)

(58) Field of Classification Search
CPC .................. G06F 3/03545; G06F 2203/04101; G06F 3/03547; G06F 3/0325; G06F 3/0346; G06F 3/0354
USPC ......................................................... 345/156
See application file for complete search history.

(56) References Cited

U.S. PATENT DOCUMENTS

| | | | | |
|---|---|---|---|---|
| 6,624,833 | B1 * | 9/2003 | Kumar | G06F 3/017 345/156 |
| 7,692,625 | B2 * | 4/2010 | Morrison | G06F 3/0428 345/156 |
| 8,515,128 | B1 * | 8/2013 | Hildreth | G06F 3/017 345/156 |
| 2002/0015064 | A1 * | 2/2002 | Robotham | G06F 3/0481 715/863 |
| 2005/0122308 | A1 * | 6/2005 | Bell | G06F 3/011 345/156 |
| 2006/0214926 | A1 * | 9/2006 | Kolmykov-Zotov | G06F 3/04842 345/179 |
| 2008/0122798 | A1 * | 5/2008 | Koshiyama | G06F 3/0412 345/173 |

(Continued)

FOREIGN PATENT DOCUMENTS

JP        5-241733 A      9/1993

*Primary Examiner* — Julie Anne Watko

(74) *Attorney, Agent, or Firm* — Canon U.S.A., Inc. IP Division

(57) ABSTRACT

An information processing apparatus configured to recognize a touch of a recognition object onto an operation surface based on a proximity state between the operation surface and the recognition object, includes a position detection unit configured to detect an instruction position indicated by the recognition object, and an identification unit configured to identify a position at which the instruction position detected by the position detection unit is estimated to stop moving while the operation surface and the recognition object are located closer to each other than a predetermined distance, as a position touched by the recognition object.

16 Claims, 13 Drawing Sheets

(56) References Cited

U.S. PATENT DOCUMENTS

| | | | | |
|---|---|---|---|---|
| 2009/0174679 A1* | 7/2009 | Westerman | G06F 3/03547 | 345/173 |
| 2009/0249252 A1* | 10/2009 | Lundy | G06F 3/0237 | 715/817 |
| 2009/0292989 A1* | 11/2009 | Matthews | G06F 3/0488 | 715/702 |
| 2009/0315740 A1* | 12/2009 | Hildreth | G06F 3/017 | 341/20 |
| 2009/0315848 A1* | 12/2009 | Ku | G06F 3/0416 | 345/173 |
| 2010/0045705 A1* | 2/2010 | Vertegaal | A47G 19/2227 | 345/661 |
| 2010/0127995 A1* | 5/2010 | Rigazio | G06F 3/04886 | 345/173 |
| 2010/0306702 A1* | 12/2010 | Warner | G06F 3/0482 | 715/811 |
| 2011/0080490 A1* | 4/2011 | Clarkson | G06F 3/017 | 348/222.1 |
| 2011/0181510 A1* | 7/2011 | Hakala | G06F 3/017 | 345/158 |
| 2011/0185320 A1* | 7/2011 | Hinckley | G06F 3/04883 | 715/863 |
| 2011/0209104 A1* | 8/2011 | Hinckley | G06F 3/0416 | 715/863 |
| 2012/0235912 A1* | 9/2012 | Laubach | G06F 3/04895 | 345/163 |
| 2012/0281018 A1* | 11/2012 | Yamamoto | G06F 1/1626 | 345/634 |
| 2012/0327009 A1* | 12/2012 | Fleizach | G06F 3/04883 | 345/173 |
| 2014/0028628 A1* | 1/2014 | Hildreth | G06F 3/017 | 345/175 |
| 2014/0298266 A1* | 10/2014 | Lapp | G06F 3/04883 | 715/835 |

\* cited by examiner

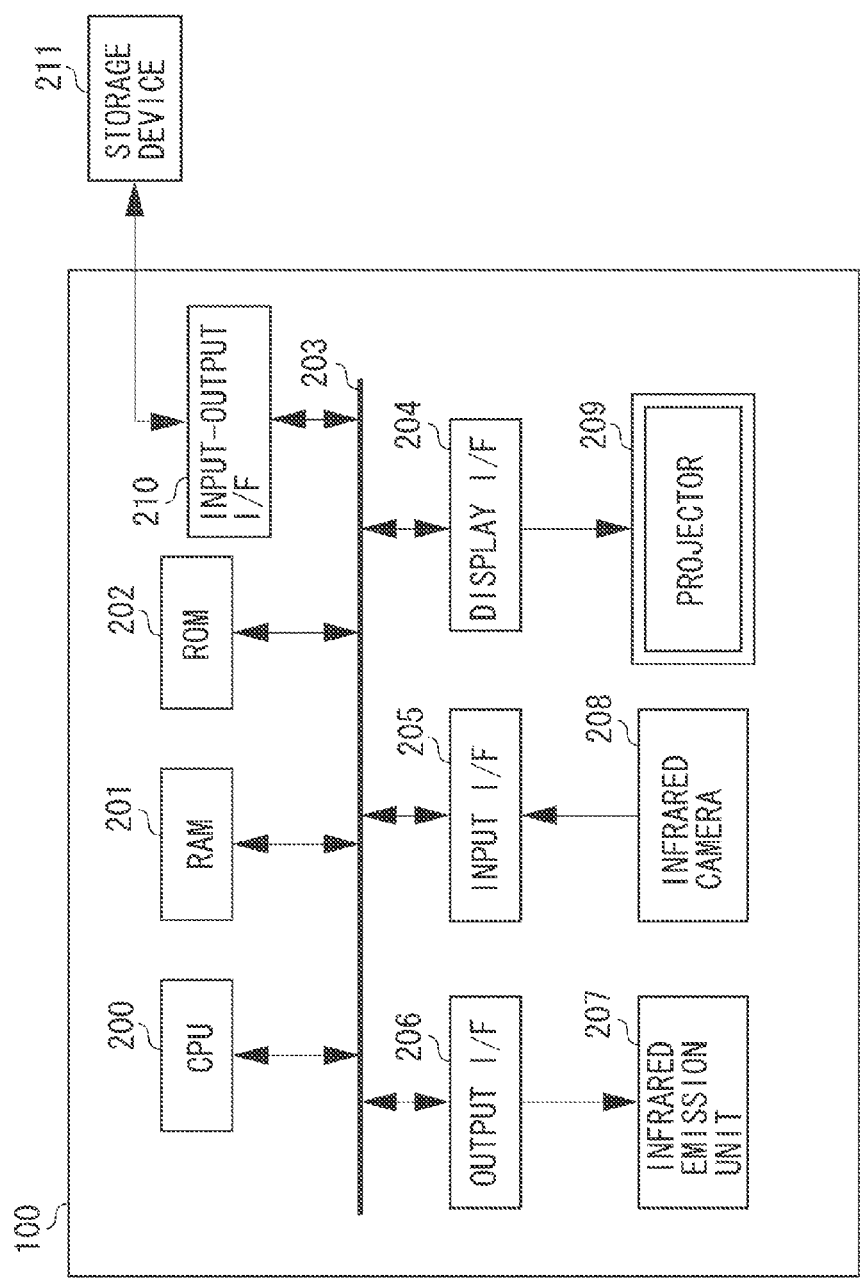

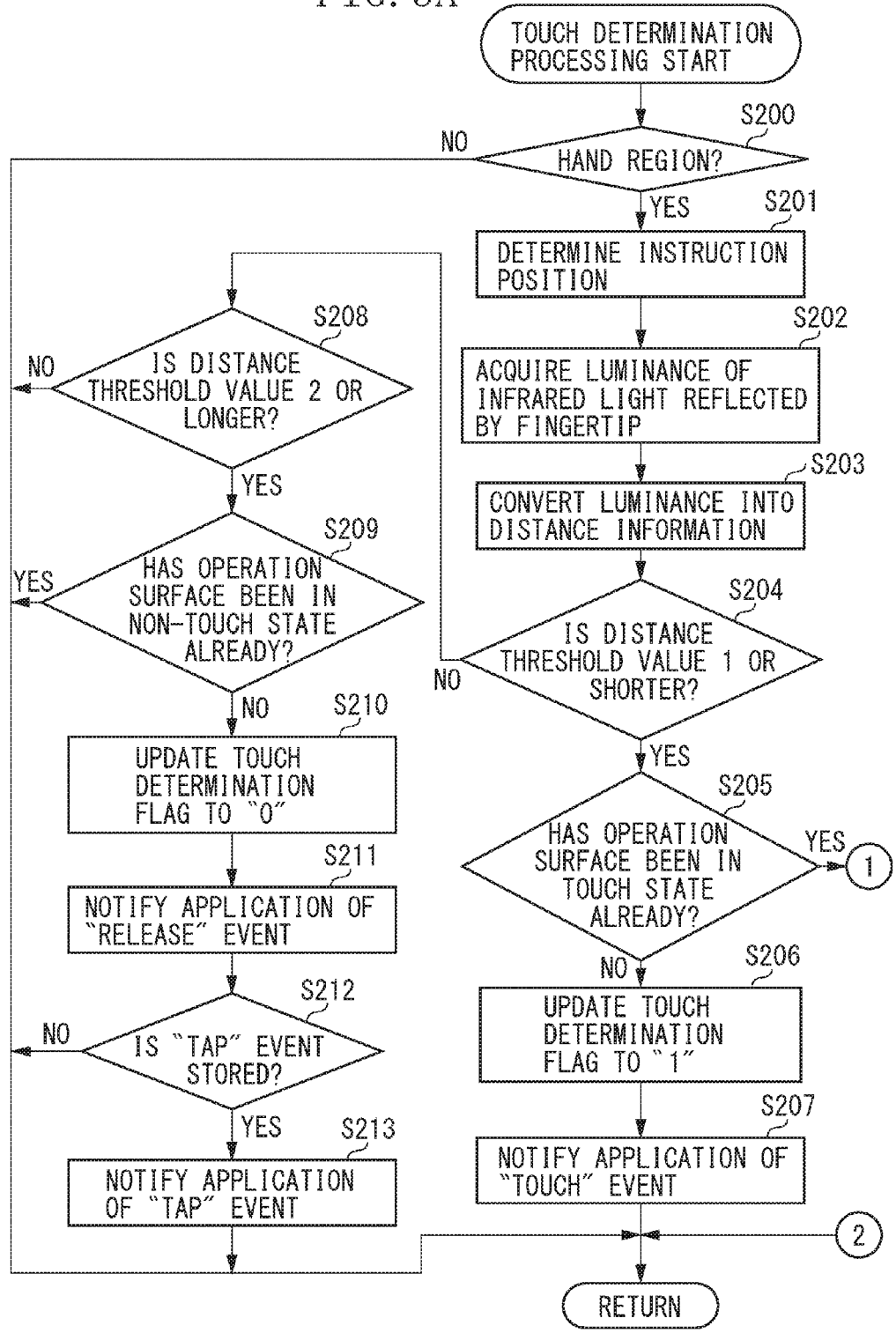

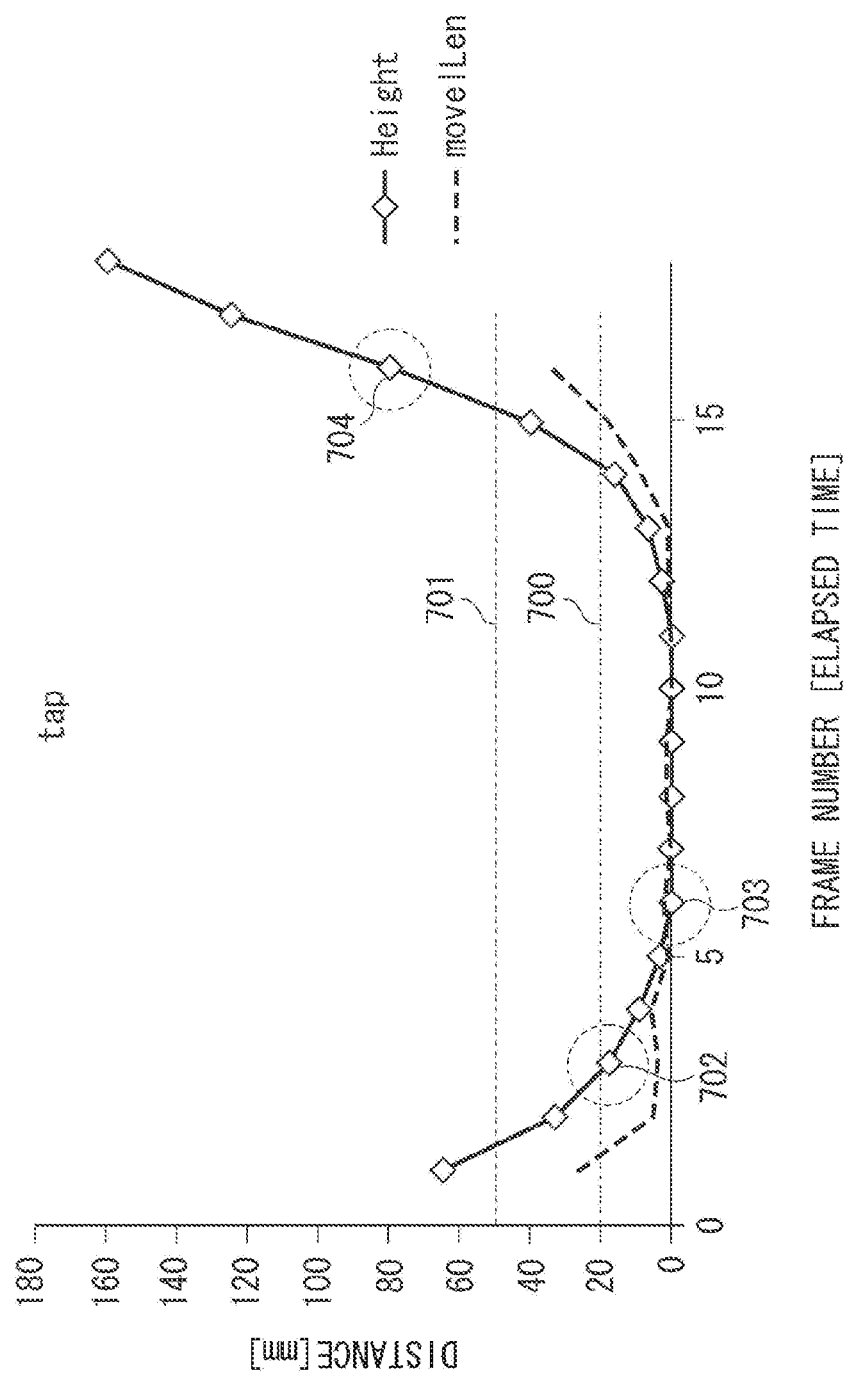

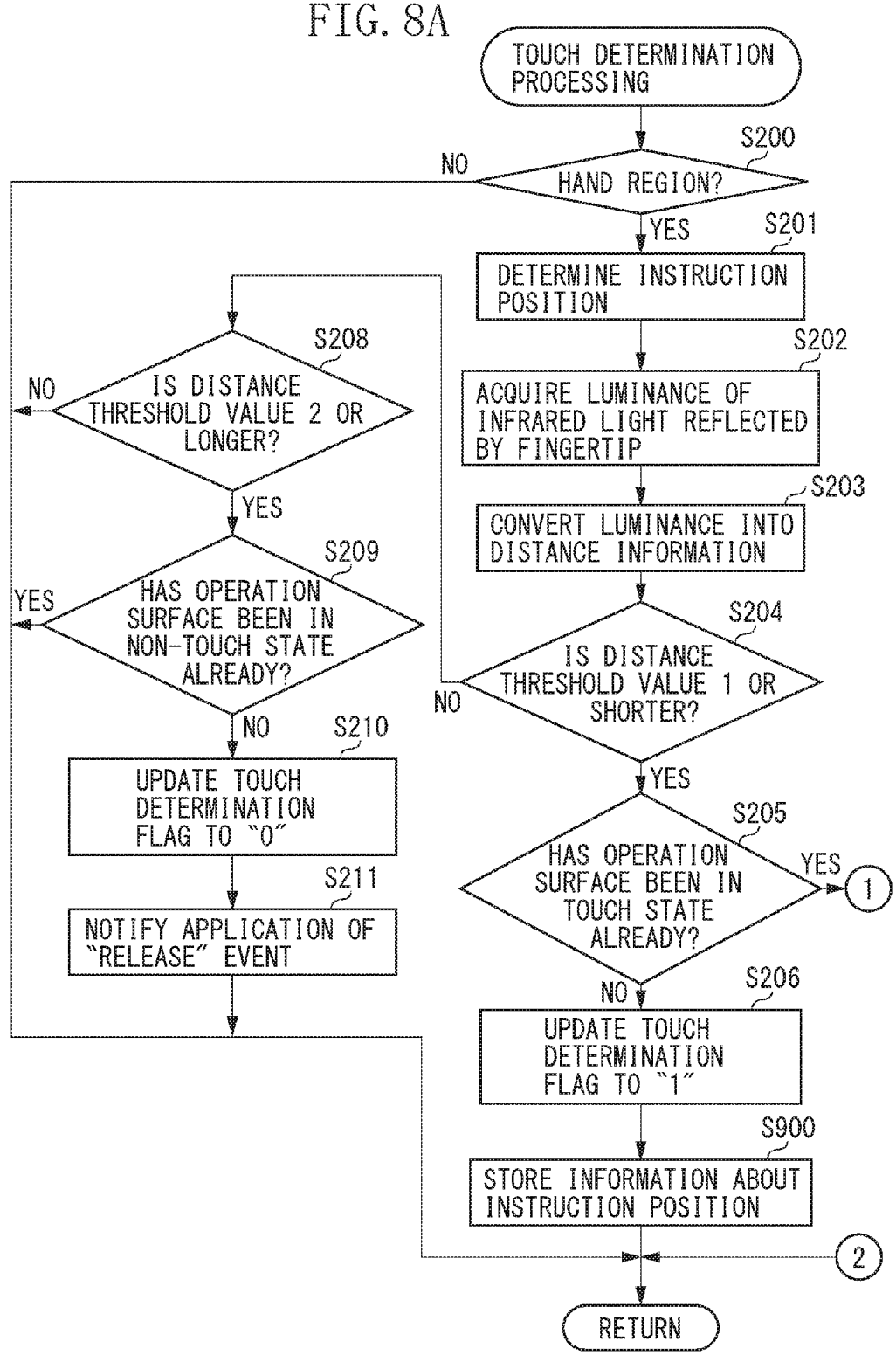

INFORMATION PROCESSING APPARATUS, METHOD FOR CONTROLLING INFORMATION PROCESSING APPARATUS, AND STORAGE MEDIUM

BACKGROUND OF THE INVENTION

1. Field of the Invention

The present disclosure generally relates to information processing and, more particularly, to an information processing apparatus, method for controlling the information processing apparatus, storage medium, and to a technique for recognizing a touch operation performed by a recognition object based on a proximity state between the recognition object and a touch target surface.

2. Description of the Related Art

In recent years, in some situations, a touch operation has been performed on a physically non-existent operation surface (a virtual surface) in an augmented reality (AR) environment or a mixed reality (MR) environment. Further, in some situations, a user interface (hereinafter referred to as a UI) has been projected on an arbitrary operation surface such as a wall or a desk by projection, and the touch operation has been performed on the projected UI. In such situations, whether the operation surface and a recognition object are in contact with each other is often determined by a determination based on a distance between the operation surface and the recognition object (for example, a user's fingertip), which should be recognized as an instruction portion that performs the operation, with use of a stereo camera, a range image sensor, or the like. More specifically, a predetermined threshold value is prepared for the distance between the operation surface and the user's fingertip. Then, if this distance is shorter than the threshold value, it is determined that the operation surface is in a "touch state", which indicates such a state that the operation surface is touched. On the other hand, if this distance is longer than the threshold value, it is determined that the operation surface is in an "non-touch state (released state)", which indicates such a state that the operation surface is not touched. Then, a position of the fingertip at the time of a shift from the non-touch state into the touch state is identified as a touch position. On the other hand, a position of the fingertip at the time of a shift from the touch state into the non-touch state is identified as a position at which the touch ends (a release position).

However, if a resolution for a detectable distance is low (coarse), an error may occur in a timing when the state is determined and in the identified position. Further, even if the resolution for the distance is high, setting a large value as the threshold vale for distinguishing the touch state and the non-touch state from each other (for example, setting a value larger than the width of the fingertip as the threshold value) may lead to the same problem.

In optical touch panels, it is determined that the distance between the display item and the instruction portion falls below the predetermined threshold value according to detection of interruption of light emitted to a detection surface set in parallel with the operation surface. According to a technique discussed in Japanese Patent Application Laid-Open No. 5-241733, how a finger is inclined is recognized by detecting positions of the instruction portion on two-step detection surfaces, for correcting an error in a position of the instruction portion, which is generated between a height of the detection surface and a height of the actual operation surface due to an inclination of the finger touching the operation surface.

However, according to the conventional technique discussed in Japanese Patent Application Laid-Open No. 5-241733, a positional relationship between the operation surface and the two-step detection surfaces is fixed when a product is designed. Therefore, this technique has not been considered to be applied to a case where the operation surface is set on the virtual surface or the operation surface is set on the arbitrary plane.

SUMMARY OF THE INVENTION

According to an aspect of the present disclosure, an information processing apparatus, which is configured to recognize a touch of a recognition object onto an operation surface based on a proximity state between the operation surface and the recognition object, includes a position detection unit configured to detect an instruction position indicated by the recognition object, and an identification unit configured to identify a position at which the instruction position detected by the position detection unit is estimated to stop moving while the operation surface and the recognition object are located closer to each other than a predetermined distance, as a position touched by the recognition object.

Further features of the present disclosure will become apparent from the following description of exemplary embodiments with reference to the attached drawings.

BRIEF DESCRIPTION OF THE DRAWINGS

FIGS. 2A and 2B are block diagrams illustrating a hardware configuration and a functional configuration of the information processing apparatus, respectively.

FIGS. 5A and 5B are a flowchart illustrating touch determination processing according to a first exemplary embodiment.

FIGS. 6A, 6B, and 6C illustrate an example of data acquired when a tap operation is performed with use of the information processing apparatus.

FIGS. 8A and 8B are a flowchart illustrating touch determination processing according to a modification of the first exemplary embodiment.

DESCRIPTION OF THE EMBODIMENTS

In the following description, exemplary embodiments of the present disclosure will be described in detail with reference to the drawings. The exemplary embodiments that will be described below merely indicate examples when the present disclosure is carried out specifically, and are not intended to limit the present disclosure thereto.

First, a first exemplary embodiment will be described as an exemplary embodiment that identifies a position at which a user's fingertip is estimated to stop moving in a touch state as a position that a user touches (hereinafter referred to as a touch position) after distinguishing the touch state and an non-touch state from each other based on a distance between a recognition object and an operation surface. The touch position is indicated by positional coordinates in a two-dimensional plane (an xy plane), which is designated by a touch input, in parallel with the operation surface, and includes at least a touch start position at which the touch input starts and a touch end position at which the touch input ends. The present exemplary embodiment will be described, taking a user's hand and its fingertip as an example of the recognition object that should be recognized as an instruction portion used in an operation performed on an information processing apparatus. However, the present exemplary embodiment can be applied even when the recognition object is replaced with an operation tool such as a stylus pen or a pointer.

Figure 1:
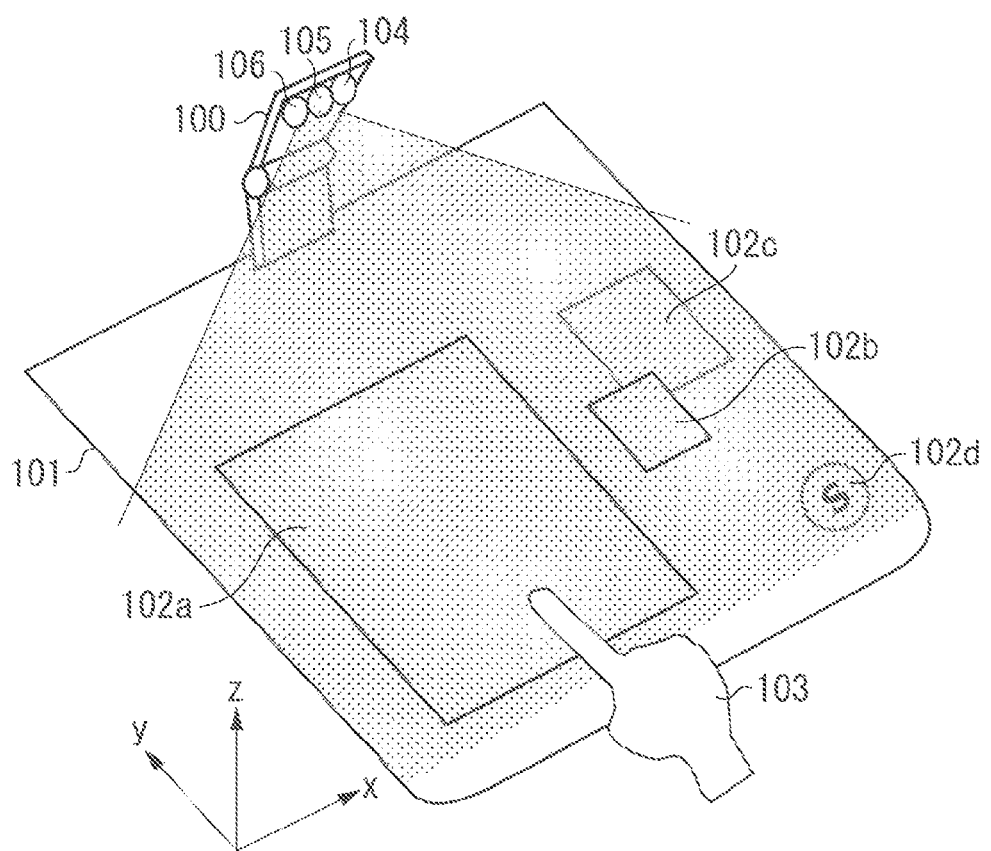
FIG. 1 illustrates an example of an outer appearance of an information processing apparatus, and an example of an environment under which the information processing apparatus is used.

FIG. 1 illustrates an example of an outer appearance of a system including an information processing apparatus 100, which will be described in the present exemplary embodiment, set therein.

FIG. 2A is a block diagram illustrating an example of a hardware configuration of the information processing apparatus 100 according to the present exemplary embodiment. In FIG. 2A, a central processing unit (CPU) 200 comprehensively controls respective devices connected thereto via a bus 203. An operating system (OS), respective processing programs relating to the present exemplary embodiment, which are illustrated in flowcharts that will be described below, device drivers, and the like are stored in a read only memory (ROM) 202. These programs are temporarily stored in a random access memory (RAM) 201, and are executed by the CPU 200 at appropriate timings. The RAM 201 is used as a temporary storage area accessible at a high speed, such as a main memory and a work area of the CPU 202. The OS, the respective processing programs, and the like may be stored in an external storage device 211. In this case, necessary information is read into the RAM 201 as appropriate, when the information processing apparatus 100 is powered on. Further, a display interface (I/F) 204 converts a display image generated within the information processing apparatus 100 into a signal processable by a projector 209. An input I/F 205 receives an infrared image generated by an infrared camera 208 as an input signal, and converts the received image into information processable by the information processing apparatus 100. An output I/F 206 converts an infrared emission command generated within the information processing apparatus 100 into a signal processable by an infrared emission unit 207. As used herein, the term "unit" generally refers to any combination of software, firmware, hardware, or other component that is used to effectuate a purpose.

In the present exemplary embodiment, suppose that digital data to be projected by the information processing apparatus 100 is stored in the storage device 211. A storage device connected to the information processing apparatus 100 via any of various kinds of I/Fs 210 including a network and a universal serial bus (USB), such as a disk device and a flash memory, is used as the storage device 211.

In the present exemplary embodiment, the infrared camera 208 is an imaging unit used to detect a movement of the recognition object from image information. An infrared intensity image generated by the infrared camera 208 is temporarily stored in the RAM 201 as an input image, is processed by the CPU 200 appropriately, and is then discarded. However, necessary data may be stored in the storage device 211, if appropriate.

In the following description, when the same components are described with reference to other drawings, these components will be identified by the same reference numerals, and descriptions thereof will be omitted.

As illustrated in FIG. 1, the information processing apparatus 100 can set an arbitrary plane as the operation surface by emitting projection light from a projection light emission unit 105 of the projector 209. FIG. 1 illustrates a state in which the information processing apparatus 100 is set on a table 101, and projects the operation surface on a table surface. In FIG. 1, UI members (hereinafter collectively referred to as a display item) 102a to 102d such as electronic data and a button are projected by the projector 209 on the table surface. The present exemplary embodiment will be described based on an example in which the user performs a touch operation on the display item with use of a user's hand/finger 103. Further, the present exemplary embodiment will be described based on an example in which an image is projected on the table 101. However, the operation surface 101 may be another object than the table. For example, the projection light may be emitted to a wall surface, and the wall surface may be used as the operation surface 101. Further, the surface does not necessarily have to be a flat surface, and another surface than the flat surface can be used as the operation surface 101. Further, the infrared light generated by the infrared emission unit 207 is emitted from a light emitting element 104 toward the projection surface, is reflected by the user's hand/finger 103 or the like, and is imaged by the infrared camera 208 as infrared reflection light. In FIG. 1, a lens 106 is a lens for imaging by the infrared camera 208. The information processing apparatus 100 determines a proximity state between the hand/finger 103 and the table surface based on a result of measurement of a three-dimensional position of the hand/finger 103 by performing various kinds of image processing on the infrared intensity image acquired by the infrared camera 208, thereby determining whether the hand/finger 103 touches the table surface. In the present exemplary embodiment, as illustrated in FIG. 1, an x axis and a y axis are set on a two-dimensional plane in parallel with the operation surface 101, and a z axis is set in a height direction perpendicular to the operation surface 101. Then, three-dimensional positional information is handled as coordinate values. However, the x, y, and z axes do not necessarily have to be coordinate axes in a parallel relationship or a perpendicular relationship with the operation surface 101, if the operation surface 101 is not a flat surface, or depending on a positional relationship between the user and the operation surface 101. Even in this case, the z axis is set in a direction in which a proximity relationship between the recognition object and the operation surface 101 (how long a distance therebetween is) is detected, and the x and y axes are set in directions intersecting with the z axis.

Figure 2B:
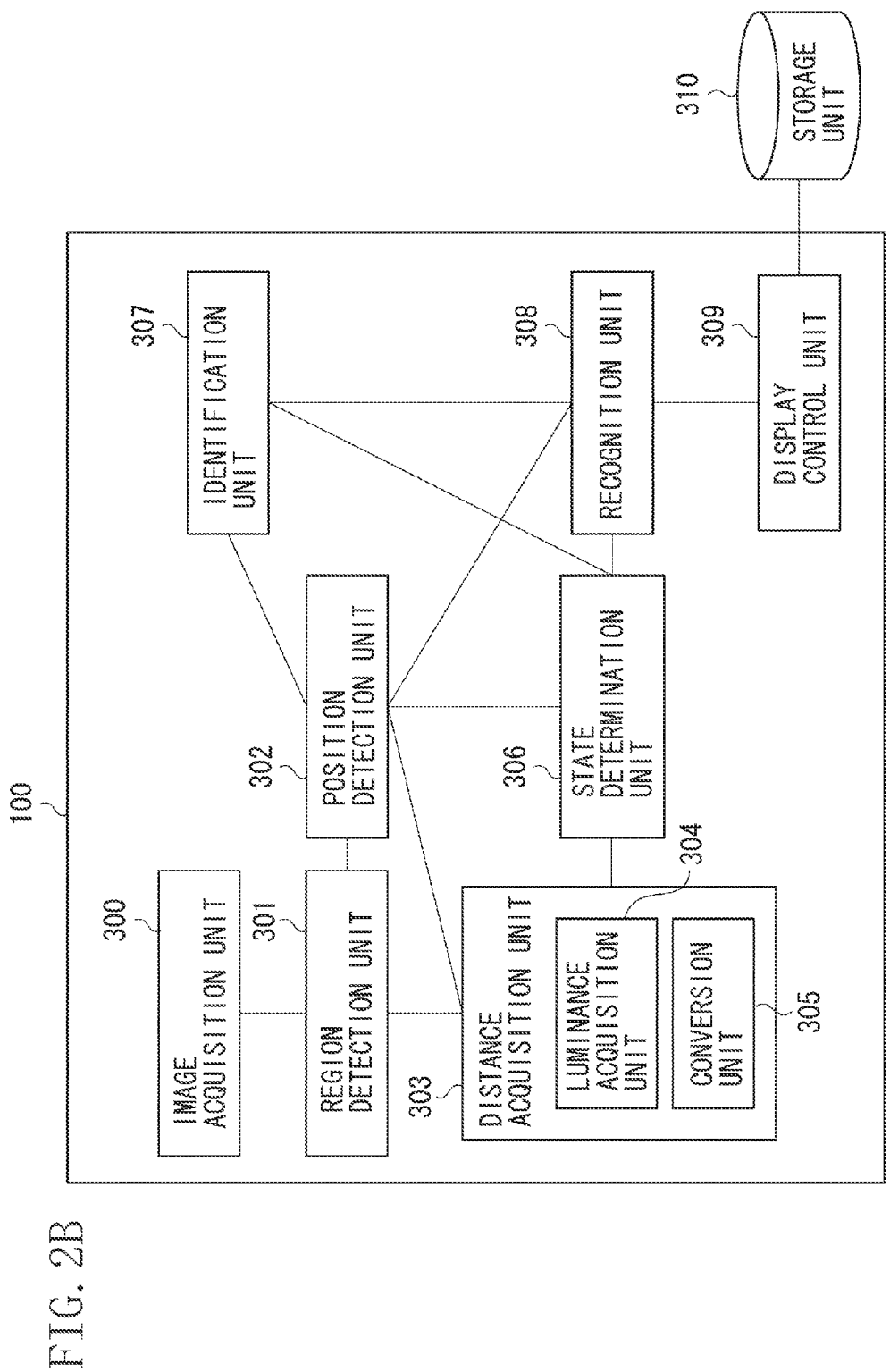

FIG. 2B is a block diagram illustrating an example of a functional configuration of the information processing apparatus 100 according to the present exemplary embodiment. The information processing apparatus 100 includes an image acquisition unit 300, a region detection unit 301, a position detection unit 302, and a luminance acquisition unit 304. Further, the information processing apparatus 100 includes a conversion unit 305, a state determination unit 306, an identification unit 307, a recognition unit 308, and a display control unit 309. The CPU 200 loads the program stored in the ROM 202 into the RAM 201 to perform processing according to the respective flowcharts that will be described below, by which these respective functional units are realized. Further, for example, if the present exemplary embodiment is carried out by means of hardware instead of software processing using the above-described CPU 200, this can be realized by preparing a calculation unit(s) and a circuit(s) corresponding to the processing of the respective functional units that will be described herein.

In the present exemplary embodiment, the information processing apparatus 100 constantly emits the infrared light from the infrared emission unit 207 in a same direction as a projection direction of the projector 209 once the information processing apparatus 100 is started up. When the user's hand/finger 103 enters a projection range of the projector 209, the infrared light is reflected by a surface of the hand/finger 103, and is imaged by the infrared camera 208 as an infrared reflection intensity.

The image acquisition unit 300 acquires the infrared intensity image captured by the infrared camera 208 at every predetermined time, and stores the acquired image into the RAM 201 as needed. The infrared intensity image includes a luminance value that indicates the infrared reflection intensity. The stored infrared intensity image is sequentially processed by the respective functional blocks of the information processing apparatus 100. In the present exemplary embodiment, a cycle per which the image acquisition unit 300 acquires the infrared intensity image corresponds to a frame rate of a video image captured by the infrared camera 208. However, a predetermined time that is not limited to the frame rate can be also set as the cycle of the image acquisition.

The region detection unit 301 detects a region where the user's hand as the recognition object is imaged by analyzing the infrared intensity image stored in the RAM 201. Hereinafter, the region where the user's hand is imaged will be referred to as simply a hand region. Further, the region detection unit 301 labels the detected hand region, and stores a result thereof into the RAM 201.

The position detection unit 302 identifies an instruction position from the hand region labeled by the region detection unit 301, and stores a result thereof into the RAM 201. In the present exemplary embodiment, the instruction position is a position of a fingertip of the user's hand. If an operation tool such as a pointer or a stylus pen is used as the recognition object, the present exemplary embodiment can be carried out by setting a position of its tip as the instruction position.

A distance acquisition unit 303 acquires a distance between the user's fingertip and the operation surface 101 based on infrared intensity information of a movement region detected by the region detection unit 301 and the instruction position detected by the position detection unit 302. The distance acquisition unit 303 according to the present exemplary embodiment includes the luminance acquisition unit 304 and the conversion unit 305. The luminance acquisition unit 304 acquires a luminance value of an infrared reflection intensity of the instruction position with use of the infrared intensity image acquired by the image acquisition unit 300 and the instruction position detected by the position detection unit 302, and stores the acquired luminance value into the RAM 201. Then, the conversion unit 305 converts the luminance value acquired by the luminance acquisition unit 304 into a distance based on correspondence information stored in advance, and stores a result thereof into the RAM 201 as distance information acquired by the distance acquisition unit 303.

The state determination unit 306 determines whether the user's hand/finger 103 is touching the operation surface 101 based on the distance between the user's fingertip and the operation surface 101 acquired by the distance acquisition unit 303, and notifies the recognition unit 308 of information that indicates the determined state. The state determination unit 306 according to the present exemplary embodiment determines that the operation surface 101 is touched (in the touch state), if the distance between the user's fingertip and the operation surface 101 is a predetermined threshold value or shorter. On the other hand, the state determination unit 306 determines that the operation surface 101 is not touched (in the non-touch state), if the distance between the user's fingertip and the operation surface 101 is longer than the predetermined threshold value. Hereinafter, the processing for determining whether the operation surface 101 is touched will be referred to as a "touch determination".

The identification unit 307 tracks a movement of the instruction position detected by the position detection unit 302, and identifies at least the touch start position and the touch end position among positions at which the user has actually touched the operation surface 101 based on a predetermined condition, from one or more points that the instruction position has passed while the touch state continues. In the present exemplary embodiment, a position when the instruction position is estimated to stop moving while the touch state continues is identified as the touch start position or the touch end position. The touch start position and the touch end position may coincide with each other. The identification unit 307 according to the present exemplary embodiment first acquires a difference between the instruction position detected from the infrared intensity image of a previous frame acquired by the image acquisition unit 300, and the instruction position detected from the infrared intensity image of the latest frame as a movement distance of the instruction position. Then, the identification unit 307 estimates that the instruction position stops moving if the acquired movement distance is shorter than a predetermined threshold value for the distance, and identifies the instruction position detected from the infrared intensity image of the latest frame as the touch position. Use of this identification method can reduce information that should be stored to determine whether the identification unit 307 can estimate that the instruction position stops moving. However, if the identification unit 307 estimates that the instruction position keeps stopping in consecutive frames, the identification unit 307 may collectively handle these stops until the instruction position starts moving again as a single stop, as the number of times that the instruction position stops moving.

However, the method for identifying the position at which the instruction position is estimated to stop moving is not limited thereto. For example, the identification unit 307 records a difference between the instruction positions detected from consecutive two frames, i.e., the movement distance for each frame interval every time that the infrared intensity image is acquired, as long as the operation surface 101 is maintained in the touch state. Then, the identification unit 307 can estimate a position at which this difference is minimized among the recorded series of information pieces, as the position at which the instruction position stops moving. Although this method requires more information to be stored than the above-described method, this method has such an advantage that the touch position can be identified even when the user's fingertip is moving fast so that the movement distance between consecutive two frames never falls below the predetermined threshold value for the distance.

The recognition unit 308 recognizes a status of a user's input based on a result of the determination by the state determination unit 306 and the touch position identified by the identification unit 307, and notifies a functional unit relating to an application supposed to respond to the input, such as the display control unit 309, of the recognized status as a touch event. The application changes a response to a touch operation established by the touch input. When the state determined by the state determination unit 306 shifts from the non-touch state to the touch state, the recognition unit 308 according to the present exemplary embodiment notifies the relevant functional unit of a "touch" as a touch event indicating that a touch starts. Further, conversely, when the state determined by the state determination unit 306 shifts from the touch state into the non-touch state, the recognition unit 308 notifies the relevant functional unit of a "release" as a touch event indicating that the fingertip, which has touched the operation surface 101, is separated from the operation surface 101. Then, if coordinates of the instruction position indicated by the fingertip are estimated to be unchanged during a time period from the notification of the "touch" to the notification of the "release", the recognition unit 308 notifies the relevant functional unit of a "tap" as an event indicating that positional coordinates of a single point are specified. On the other hand, if the coordinates of the instruction position indicated by the fingertip are changed after the notification of the "touch" without the notification of the "release", the recognition unit 308 notifies the relevant functional unit of a "move start" event indicating that the touch position starts moving while the touch state continues. If the touch position further keeps moving, the recognition unit 308 notifies the relevant functional unit of a "move" event.

In the present exemplary embodiment, the recognition unit 308 notifies the relevant functional unit of the "tap" event when the touch start position and the touch end position coincide with each other. Whether the touch start position and the touch end position coincide with each other is determined according to whether a difference between their coordinates falls within a predetermined range. The position specified by the tap operation is referred to as a tap position. If a UI member relating to an operation to generate some command to the apparatus is displayed at the tap position, the recognition unit 308 generates this command and notifies the functional unit relating to a response of the application, such as the display control unit 309, of the generated command. Upon receiving the notification, the display control unit 309 generates a display image corresponding to the tapped UI member, and displays the generated image on the operation surface 101 by the projector 209. On the other hand, upon generation of a difference between the touch start position and the latest instruction position, the recognition unit 308 notifies the relevant functional unit of the "move start" event, and notifies the relevant functional unit of the "move" event after that as long as the touch state continues. The move is recognized as, for example, an operation for moving a display item displayed at the touch start position to the touch end position. Each of the events described above as examples is reported to each functional unit such as the display control unit 309, as information in which information that indicates the shift of the touch state or the type of the performed operation as described above is associated with information that indicates the position relating to that event on the xy plane. The x coordinate and the y coordinate are defined as coordinate axes in two-dimensional directions in parallel with the operation surface 101.

The "touch" event and the "release" event, among the events described above as examples of the touch events of which the recognition unit 308 notifies the relevant functional unit, are events that indicate a shift between the touch state and the non-touch state. On the other hand, the "move start" event (or the "move" event) and the "tap" event are events that indicate two input types incompatible with each other. Therefore, the recognition unit 308 never notifies the relevant functional unit of the "move start" event (or the "move" event) and the "tap" event at the same time. On the other hand, because whether the touch start position and the touch end position coincide with each other can be determined only after the touch ends, the recognition unit 308 always notifies the relevant functional unit of the "tap" event after notification of the "release" event. Because the recognition unit 308 notifies the relevant functional unit of the "move start" event (or the "move" event) based on whether the instruction position is moved while the touch state continues, the recognition unit 308 always notifies the relevant functional unit of the "move start" event (or the "move" event) before notification of the "release" event. When being notified of the "release" event after the "move start" event and "move" event, the display control unit 309 controls the display, taking the end position of the touch input as an end position of the move operation.

The display control unit 309 generates a display image to be projected on the projection surface with use of various kinds of display items acquired from a storage unit 310, which is a function unit of the storage device 211 and the input-output I/F 210, according to an event of which the display control unit 309 is notified from the recognition unit 308. Then, the display control unit 309 outputs the generated image to the projector 209. In the present exemplary embodiment, electronic data and a UI member (a button or the like) are arranged in the display image as the display items. Further, the display control unit 309 controls the content of the display image according to a command of which the display control unit 309 is notified from the recognition unit 308, and presents a feedback to the input touch operation.

Before processing by the information processing apparatus 100 according to the present exemplary embodiment is described in detail, a reason why the method for identifying the touch position according to the conventional technique is prone to an error will be described briefly with reference to FIGS. 3A, 3B, 3C, and 3D.

As described above, if whether the operation surface 101 is touched is determined by preparing a threshold value for the distance between the operation surface 101 and the user's fingertip, generally, the operation surface 101 is determined to be in the touch state if this distance is the threshold value or shorter, and is determined to be in the non-touch state if this distance is longer than the threshold value. Then, the position of the fingertip at the time of a shift from the non-touch state to the touch state is identified as the touch position. Further, the position of the fingertip at the time of a shift from the touch state to the non-touch state is identified as a release position. Further, the tap position relating to the tap operation is often defined by the touch position. A value suitable to a resolution of a detector for detecting the distance is set as the threshold value used at this time. For example, if the same value as the resolution is set as the threshold value, this results in a more strict determination made about whether the operation surface 101 is touched. Further, for example, setting a larger value than the resolution (by several centimeters) according to user's usability allows the information processing apparatus 100 to determine that the touch state is established when the user just moves his/her fingertip somewhat close to the operation surface 101 even without necessarily touching the operation surface 101.

Figure 3A:
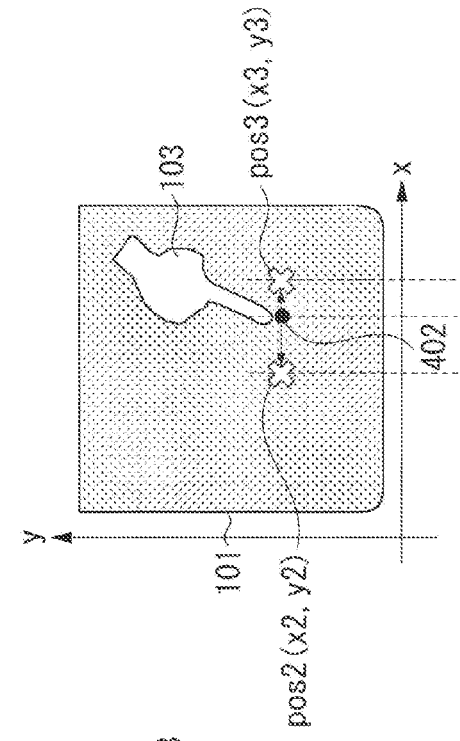
FIGS. 3A, 3B, 3C, and 3D illustrate a reason why an error occurs in a position at which a fingertip contacts an operation surface.
Figure 3C:
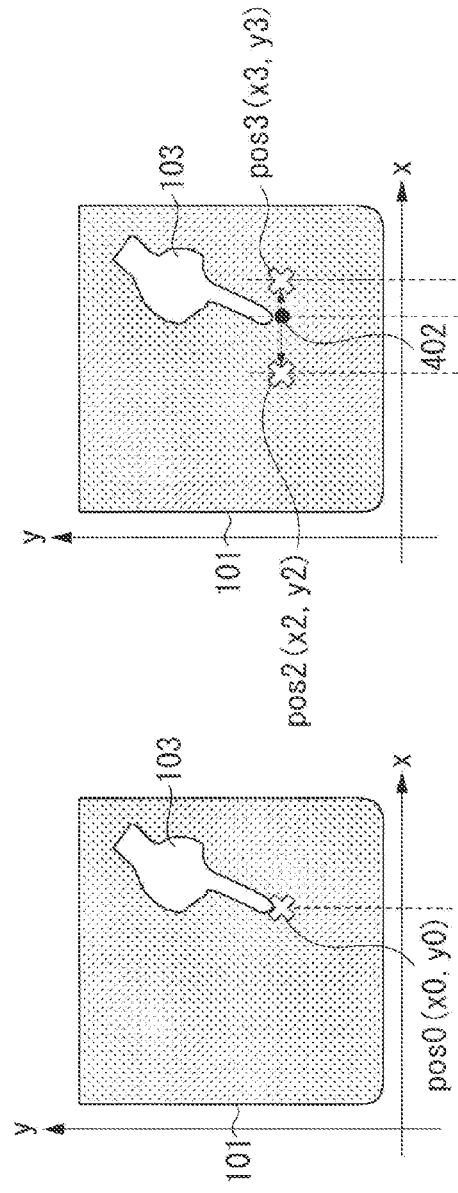
Figure 3B:
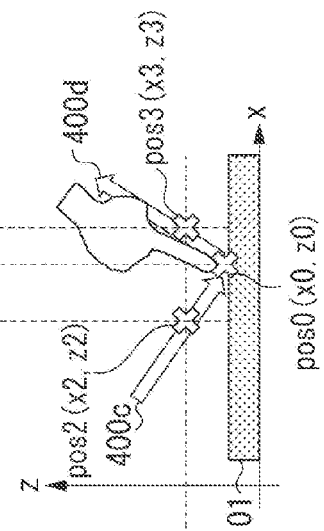
Figure 3D:
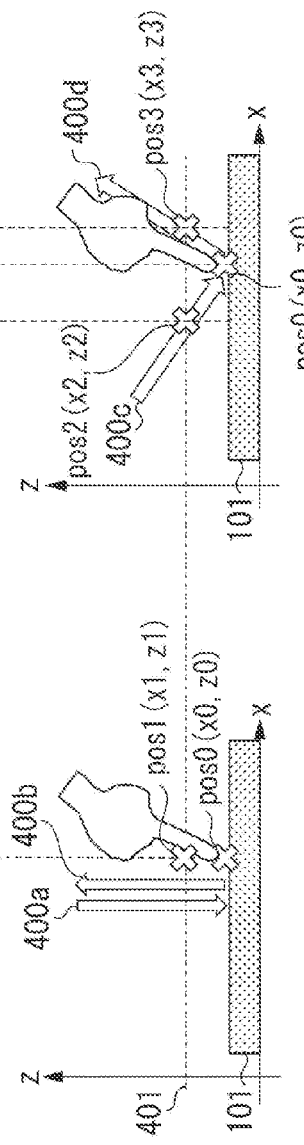

FIGS. 3A, 3B, 3C, and 3D illustrate a specific example of how the touch position and the release position are identified according to this conventional method. As indicated by the coordinate axes illustrated in the drawings, the upper two drawings, i.e., FIGS. 3A and 3C illustrate the operation surface 101 corresponding to the xy plane as viewed from above, and the lower two drawings, i.e., FIGS. 3B and 3D illustrate the operation surface 101 as viewed from the side. The threshold value for the distance between the operation surface 101 and the user's fingertip, which is used in the touch determination, is set as a value on the z axis, i.e., a threshold value for the distance from the operation surface 101 in the height direction.

FIGS. 3A and 3B illustrate a state in which the user taps a position Pos0 as if moving his/her fingertip perpendicularly to the operation surface 101.

In this example, suppose that the user's fingertip taps the position Pos0 while taking a route from 400a to 400b, as illustrated in FIG. 3B. If a height 401 illustrated in FIG. 3B is set as the threshold value used in the touch determination, and the position of the fingertip when the state of the operation surface 101 is determined to have shifted is identified as the touch position and the release position, both of the touch position and the release position are located at a position Pos1 (x1, z1). At this time, this position Pos1 has a different z value from the actual tap position Pos0 (x0, z0), but the touch operation input onto the operation surface 101 such as the tap operation is recognized based on the touch position on the xy plane, whereby the position as intended by the user can be recognized as the tap position.

On the other hand, FIGS. 3C and 3D illustrate a state in which the user taps the position Pos0 in the middle of moving his/her fingertip in a direction in parallel with the operation surface 101. In many cases, the user does not perform an operation while paying attention to the threshold value for the touch determination, and does not try to stick to a movement perpendicular to the operation surface 101, whereby the user often performs the touch operation while also moving his/her finger slightly in the direction in parallel with the operation surface 101 in this manner.

In the present example, suppose that the user's fingertip taps the position Pos0 while taking a route from 400c to 400d, as illustrated in FIG. 3D. If the height 401 is set as the threshold value used in the touch determination in a similar manner to FIGS. 3A and 3B, the touch position and the release position are identified as positions Pos2 (x2, z2) and Pos3 (x3, z3), respectively. In this case, the identified positions have different values for all of x, y, and z values from the position Pos0 that the user wants to tap actually, whereby the tap position intended by the user cannot be recognized. FIG. 3C illustrates that a position 402 indicates the position actually intentionally tapped by the user, and an error is generated between this position and each of the touch position and the release position. The touch position and the release position may be determined to be different from each other depending on the threshold value for determining whether the touch position and the release position coincide with each other, so that this operation may be recognized as the move operation. Further, even if the touch position and the release position are determined to coincide with each other, the generated error may cause an incorrect operation depending on how the tap position is defined. For example, if the tap position is defined to be the same as the touch position, and UI members corresponding to different commands are displayed at the tap position Pos0 (x0, z0) intended by the user and the touch start position Pos2 (x2, z2) identified by the conventional method, this error causes an incorrect operation for the user. The same problem also arises when the tap position is defined to be the same as the touch end position.

The present exemplary embodiment is directed to reducing an error in the touch position, which is generated in this manner, and realizing identification of the touch position or the release position as intended by the user.

Next, the processing by the information processing apparatus 100 according to the present exemplary embodiment will be described in detail with reference to flowcharts illustrated in FIGS. 4, 5A and 5B.

Figure 4:
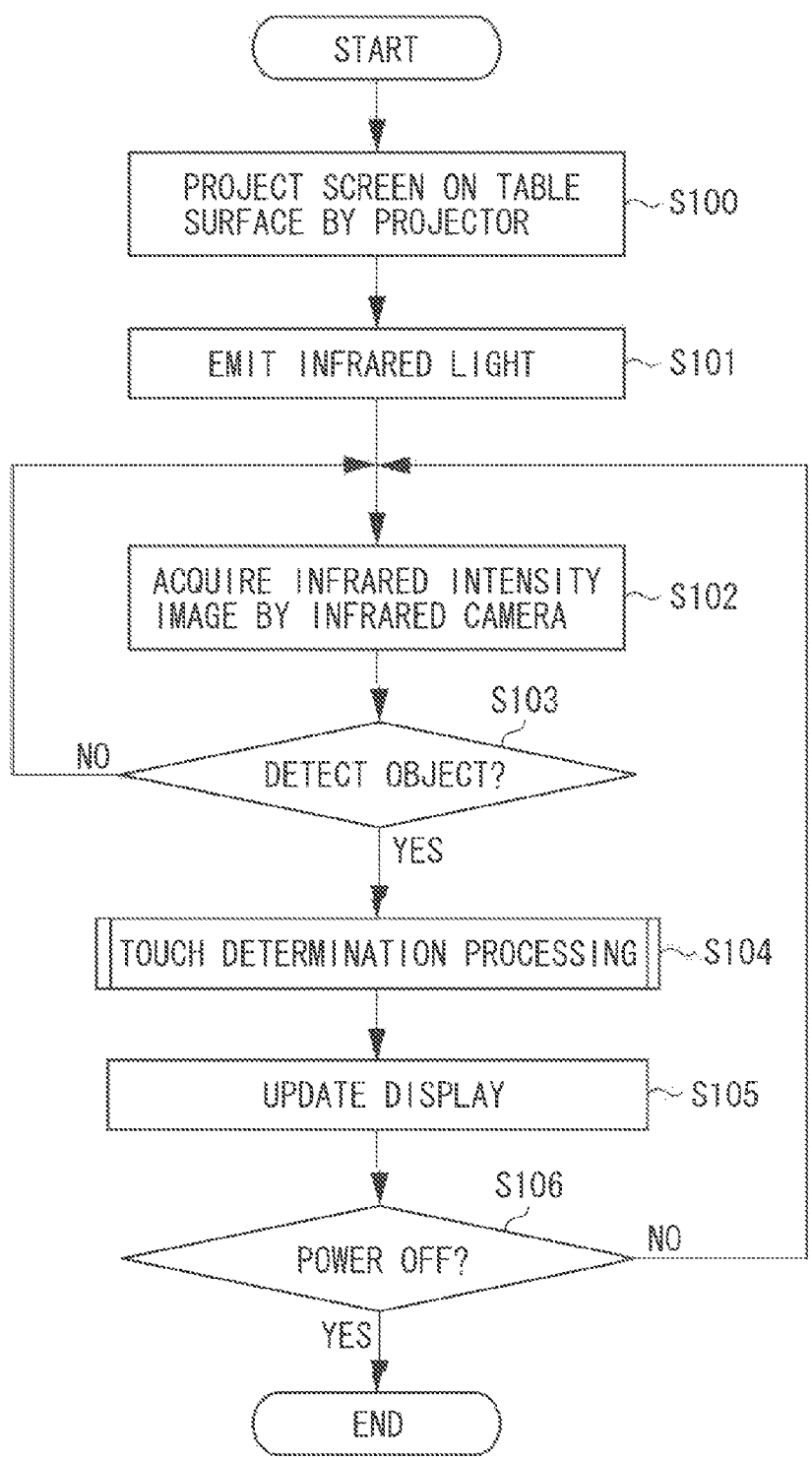
FIG. 4 is a flowchart illustrating main processing performed by the information processing apparatus according to an exemplary embodiment of the present disclosure.

FIG. 4 is a flowchart illustrating an example of a flow of main processing performed by the information processing apparatus 100 according to the present exemplary embodiment to recognize the touch operation. In the present exemplary embodiment, a start of the flowchart illustrated in FIG. 4 is started when the information processing apparatus 100 is powered on.

First, in step S100 illustrated in FIG. 4, the display control unit 309 acquires data relating to a graphical user interface (GUI) screen from the storage unit 310. Then, the display control unit 309 generates a display image in which display items such as UI members are arranged based on the acquired data, and outputs the generated image to the projector 209. As a result, the display image projected by the projector 209 is displayed on the operation surface 101.

In step S101, the information processing apparatus 100 emits infrared light in the same direction as the direction in which the projector 209 projects the image. The infrared light is emitted from the infrared emission unit 207 mounted on the information processing apparatus 100. The infrared light is constantly emitted as long as the information processing apparatus 100 is powered on, since step S101 is performed. When the user's hand/finger 103 or another object set as the recognition object enters the projection range of the projector 209, the infrared light is reflected on the surface thereof. At this time, a range where the infrared light is emitted is calibrated in such a manner that the infrared light is appropriately reflected in an entire region within the projection range. Further, the infrared reflection light is imaged by the infrared camera 208 mounted on the information processing apparatus 100 as the infrared intensity image.

In step S102, the image acquisition unit 300 acquires the infrared intensity image captured by the infrared camera 208 at predetermined frame intervals, and stores the acquired image for each frame into the RAM 201.

In step S103, the region detection unit 301 analyzes the infrared intensity image stored in the RAM 201, and determines whether any object is detected within the projection range. In the present exemplary embodiment, the region detection unit 301 extracts a difference (a background difference) between the infrared intensity image when some object exists in the image, and the infrared intensity image when only the operation surface 101 exists in the image by utilizing a property of the infrared light having a different reflection intensity depending on an object by which the light is reflected. The region detection unit 301 detects a region where any object exists based on this difference. However, the detection method is not limited thereto. For example, if a stereo camera or a range image sensor is used as the imaging unit for detecting the recognition object instead of the infrared camera 208, the movement region where any object exists in the image can be detected with use of information about a skin color, information about a hand model, and the like. If the region detection unit 301 determines that any object is detected (YES in step S103), the processing proceeds to step S104. If the region detection unit 301 determines that no object is detected (NO in step S103), the processing returns to step S102, and the processes of steps S102 and S103 are repeated until any object is detected.

In step S104, the state determination unit 306 determines whether the operation surface 101 is in the state of being touched by the recognition object, and the touch determination processing for recognizing a touch input is performed. In the touch determination processing in step S104, upon recognition of a touch operation based on a result of the determination, the recognition unit 308 notifies the application of any of the touch events "touch", "release", "tap", "move start", and "move". The details of the touch determination processing according to the present exemplary embodiment will be described below with reference to the flowchart illustrated in FIGS. 5A and 5B.

In step S105, the application outputs a result from interpretation of the touch input recognized in step S104 as the touch operation. Especially in the present exemplary embodiment, the display control unit 309 controls the content of the display image projected by the projector 209. For example, in response to notification of the "touch", the display control unit 309 changes the display image in such a manner that a display item displayed at the touch start position is changed in display style, or reflects a result of processing corresponding to a GUI member displayed at the touch start position into the display image. Alternatively, the display control unit 309 displaces the display item displayed at the instruction position in response to notification of any one of the "move start" and the "move". Alternatively, the display control unit 309 fixes the position of the display item having been displaced in response to notification of the "release". Alternatively, the display control unit 309 reflects a result of processing corresponding to a GUI member displayed at the touch start position into the display image in response to notification of the "tap" event.

After completion of the process of step S105, in step S106, the information processing apparatus 100 determines whether the information processing apparatus 100 should be powered off. In the present exemplary embodiment, the information processing apparatus 100 determines that the information processing apparatus 100 should be powered off if an instruction for powering off the information processing apparatus 100 is input through an input onto a physical button or a GUI, or if a predetermined time period has elapsed with the recognition object kept undetected. If the information processing apparatus 100 determines that the information processing apparatus 100 should not be powered off (NO in step S106), the processing returns to step S102, and the information processing apparatus 100 repeats recognition of a touch operation by repeating the above-described processes every time the recognition object is detected. On the other hand, if the information processing apparatus 100 determines that the information processing apparatus 100 should be powered off (YES in step S106), the information processing apparatus 100 ends all kinds of processing.

Now, the details of the touch determination processing performed in step S104 according to the present exemplary embodiment will be described with reference to the flowchart illustrated in FIGS. 5A and 5B.

Upon a start of the process of step S104 in response to the completion of the process of step S103, first, in step S200, the region detection unit 301 determines whether the region detected by the region detection unit 301 is the hand region. More specifically, in the present exemplary embodiment, the region detection unit 301 determines whether the object existing in this region is the hand region by briefly recognizing a hand shape with use of a size and an aspect ratio of the detected object region. If the region detection unit 301 determines that the detected region is the hand region (YES in step S200), the processing proceeds to step S201. At this time, the region detection unit 301 labels pixels corresponding to the hand region in the infrared intensity image, and stores the labeled infrared intensity image into the RAM 201. On the other hand, if the region detection unit 301 determines that the detected region is not the hand region (NO in step S200), the process of step S104 ends.

The method for determining whether the detected region is the hand region is not limited to the method using the aspect ratio. For example, the region detection unit 301 can also compare a shape of the detected region with a shape model of a human's hand registered in advance, and determine that the detected region is the hand region if a predetermined or higher likelihood is calculated. Further, in the present exemplary embodiment, the user's hand/finger 103 is set in advance as the recognition object supposed to perform an operation, whereby the region detection unit 301 determines whether the detected region is the hand region. However, the process of step S104 is actually designed as processing for determining whether the object existing in the region detected by the region detection unit 301 is the recognition object. Therefore, this process is applicable even if the recognition object is not the user's hand.

Subsequently, in step S201, the position detection unit 302 specifies the hand region in the infrared intensity image based on labeling information, and further specifies the instruction position in this hand region. In the present exemplary embodiment, an "average position of positions at which the hand region and a boundary line of an imaging range intersect with each other" is defined as an entry position of the hand/finger 103, and a farthest point in the hand region from the entry position is identified as the instruction position. In the present exemplary embodiment, the instruction position corresponds to the position of the user's fingertip. Information that indicates the detected instruction position is stored in the RAM 201. In the present exemplary embodiment, the instruction position is indicated by coordinate information based on the coordinate axes illustrated in FIGS. 3A, 3B, 3C and 3D.

Subsequently, in steps S202 and S203, the distance acquisition unit 303 performs processing for acquiring the distance between the user's fingertip and the operation surface 101. In the present exemplary embodiment, first, in step S202, the luminance acquisition unit 304 acquires the infrared intensity image stored in the RAM 201, and a luminance of the infrared light reflected by the user's fingertip from the information about the instruction position. More specifically, the luminance acquisition unit 304 acquires a luminance value that indicates an infrared intensity of pixels corresponding to the position of the fingertip. At this time, if the luminance acquisition unit 304 acquires only a luminance of a single pixel at the instruction position, this results in occurrence of a variation in the luminance. Therefore, in the present exemplary embodiment, the luminance acquisition unit 304 calculates an average of luminances in a predetermined pixel region containing the instruction position as the luminance value of the instruction position, and stores the calculated luminance value into the RAM 201.

Subsequently, in step S203, the conversion unit 305 converts the calculated luminance of the fingertip into a vertical distance Lf between the fingertip and the infrared camera 208. In the present exemplary embodiment, the conversion unit 305 acquires the vertical distance Lf from the luminance of the fingertip located at arbitrary coordinates by measuring luminances of a plurality of points located at known coordinates in a space in advance. In other words, the conversion unit 305 generates a conversion equation, and calculates the vertical distance Lf. Further, because a vertical distance Lt from the infrared camera 208 to the table 101 is also known in advance, a vertical distance hL (a height) between the fingertip and the table can be calculated from the following equation, an equation 1.

$$hL=Lt-Lf(>0) \qquad \text{(EQUATION 1)}$$

In this case, suppose that the resolution (granularity) for the vertical distance between the fingertip and the table surface, which can be calculated with use of the infrared emission unit 207 and the infrared camera 208 mounted on the information processing apparatus 100 according to the present exemplary embodiment, is 20 mm. In other words, suppose that, if the fingertip is located at a position away from the operation surface 101 by the vertical distance 20 mm or a shorter distance, it is impossible to correctly detect whether the vertical distance hL is 0 mm or 20 mm, or a different value within the range of 0 to 20 mm.

In the present exemplary embodiment, the infrared intensity image is used to detect the recognition object. Therefore, the above-described method is efficient because this method allows the distance between the fingertip and the operation surface 101 to be acquired based on the same infrared intensity image. However, the method used by the distance acquisition unit 303 to acquire the distance between the user's fingertip and the operation surface 101 is not limited thereto. For example, the distance information between the fingertip and the operation surface 101 can be also acquired based on multi-viewpoint captured images acquired by, for example, using a stereo camera. Further, the height of the fingertip located in proximity to the operation surface 101 can be also directly detected by installing a proximity positional sensor on the operation surface side.

Next, the touch determination processing by the state determination unit 306 will be described. For simplification of the following description, the term "preprocessing" will be used to refer to the flow of the series of processing steps, i.e., steps S102, S103, S200, S201, S202, and S203.

After completion of the preprocessing, in step S204, the state determination unit 306 compares the acquired vertical distance hL with a preset threshold value 1 for the touch determination, and determines whether the vertical distance hL is the threshold value 1 or shorter. The threshold value 1 is used as a threshold value for determining whether the information processing apparatus 100 shifts from the non-touch state into the touch state. If the state determination unit 306 determines that the vertical distance hL is the threshold value 1 or shorter (YES in step S204), the processing proceeds to step S205. In this case, this means that the operation surface 101 is determined to be touched, i.e., is determined to be in the touch state. On the other hand, if the state determination unit 306 determines that the vertical distance hL is longer than the threshold value 1 (NO in step S204), the processing proceeds to step S208. In this case, this means that the operation surface 101 is determined to be untouched, i.e., is determined to be in the non-touch state.

In step S205, the state determination unit 306 determines whether the operation surface 101 has been in the touch state already. In other words, the state determination unit 306 determines whether a determination result indicated the touch state when the determination was made in step S204 during previous execution of the processing. In the present exemplary embodiment, information that indicates the determination result in step S204 is stored in the RAM 201. For example, a touch determination flag is stored at this time. A value "0" set as the touch determination flag indicates the non-touch state, while a value "1" set as the touch determination flag indicates the touch state. The value of the touch determination flag is "0" in an initial state, and is updated as necessary in step S206 or step S210. In other words, in step S205, the state determination unit 306 determines that the operation surface 101 has been in the touch state already, if the touch determination flag stored in the RAM 201 at this time is "1". If the state determination unit 306 determines that the operation surface 101 has been in the touch state already (YES in step S205), the processing proceeds to step S214. On the other hand, if the state determination unit 306 determines that the operation surface 101 has not been in the touch state until this time, i.e., the operation surface 101 has been in the non-touch state (NO in step S205), the processing proceeds to step S206.

In step S206, the state determination unit 306 updates the touch determination flag stored in the RAM 201 to "1".

In step S207, the recognition unit 308 notifies the relevant application of the "touch" event. The positional information contained in the "touch" event is xy coordinates of the instruction position detected when the information processing apparatus 100 shifts from the non-touch state into the touch state. This information indicates a proximity start position at which the information processing apparatus 100 starts detecting that the recognition object is located in proximity to the operation surface 101. In other words, in the present exemplary embodiment, the state determination unit 306 determines that the information processing apparatus 100 is in the touch state in which the fingertip touches the operation surface 101, when the fingertip and the table surface are located closer to each other than a predetermined distance. Therefore, the proximity start position corresponds to the position at which the touch state starts. On the other hand, the proximity start position according to the present exemplary embodiment corresponds to the touch position according to the conventional method described above with reference to FIGS. 3A, 3B, 3C and 3D.

In this manner, the processes of steps S205 to S207 after the preprocessing are a flow of processing for notifying the relevant application of the "touch" event indicating that the operation surface 101 starts being touched by the user's hand/finger 103.

On the other hand, if the processing proceeds from step S204 to step S208 (NO in step S204), the state determination unit 306 compares the acquired vertical distance hL with a preset threshold value 2 for the touch determination, and determines whether the vertical distance hL is the threshold value 2 or longer. The threshold value 2 is a threshold value for determining whether the operation surface 101 shifts from the touch state into the non-touch state. The threshold value 1 and the threshold value 2 may be the same values, but setting a larger value as the threshold value 2 than the threshold value 1 can prevent the determination from being affected by a variation in the height information and allow a shift into the non-touch state to be conclusively determined only after the user's fingertip is separated sufficiently away from the operation surface 101. Therefore, in the present exemplary embodiment, the threshold value 1 is set so as to become larger than the threshold value 1, thereby preventing a shift into the non-touch state from being incorrectly detected. If the state determination unit 306 determines that the vertical distance hL is the threshold value 2 or longer (YES in step S208), the processing proceeds to step S209. In this case, this means that the operation surface 101 is determined to be in the non-touch state. On the other hand, if the state determination unit 306 determines that the vertical distance hL is shorter than the threshold value 2 (NO in step S208), the present processing ends, and returns to the main processing. In this case, because the information processing apparatus 100 is in such a state that it is impossible to conclusively determine whether the touch state continues or is about to end, the preprocessing is performed again to further acquire the vertical distance hL based on the movement region.

In step S209, the state determination unit 306 determines whether the information processing apparatus 100 has been in the non-touch state already. In other words, the state determination unit 306 determines whether a determination result indicated the non-touch state when the determination was made in step S208 during previous execution of the processing. In the present exemplary embodiment, the state determination unit 306 determines that the information processing apparatus 100 has been in the non-touch state already, if the touch determination flag stored in the RAM 201 is "0". If the state determination unit 306 determines that the information processing apparatus 100 has been in the non-touch state already (YES in step S209), the state determination unit 306 estimates that no touch input is performed. Then, the present processing ends, and returns to the main processing. On the other hand, if the state determination unit 306 determines that the information processing apparatus 100 has not been in the non-touch state until this time, i.e., the information processing apparatus 100 has been in the touch state (NO in step S209), the processing proceeds to step S210.

In step S210, the state determination unit 306 updates the touch determination flag stored in the RAM 201 to "0".

In step S211, the recognition unit 308 notifies the relevant application of the "release" event. The positional information contained in the "release" event is positional information that indicates at least any one of a proximity end position and the touch end position. The proximity end position is xy coordinates of the instruction position detected when the operation surface 101 shifts from the touch state into the non-touch state. The proximity end position according to the present exemplary embodiment is a position at which the information processing apparatus 100 becomes unable to detect the touch, and corresponds to the release position according to the conventional method described above with reference to FIG. 3. The touch end position is coordinate information that indicates the instruction position when the user intentionally stops touching the operation surface 101. In the present exemplary embodiment, the touch end position is a position at which the instruction position detected while the touch state continues is estimated to stop moving for the last time. A method for identifying the touch end position will be described below in a description of step S214.

In step S212, the recognition unit 308 determines whether the "tap" event has been stored in the RAM 201 by this time. As described above, whether the "tap" operation is performed cannot be conclusively determined until the touch is released. Therefore, in the present exemplary embodiment, as long as a movement of the instruction position is not detected while the touch state continues after notification of the "touch" event, the recognition unit 308 generates the "tap" event to store the generated event into the RAM 201, and is then placed into a waiting state. If the "tap" event is stored in the RAM 201 at the time of the notification of the "release" event in step S211, it is possible to conclusively determine that the tap operation is performed. Then, if the "tap" event is not stored in the RAM 201, it is conclusively determined that the instruction position moves while the touch state continues, i.e., the move operation is performed. If the recognition unit 308 determines that the "tap" event is stored in the RAM 201 (YES in step S212), the processing proceeds to step S213. If the recognition unit 308 determines that the "tap" event is not stored in the RAM 201 (NO in step S212), the present processing ends, and returns to the main processing. If the processing proceeds according to this flow route, the recognition unit 308 has notified the relevant application of the "move start" event or the "move" event already, before the notification of the "release" event in step S211. Therefore, an end of the move operation is conclusively determined by the notification of the "release" event. Then, the information about the touch end position contained in the "release" event is reported to each functional unit supposed to reply a response to the move operation as an end position of the move operation.

In step S213, the recognition unit 308 notifies the relevant application of the "tap" event, and the present processing returns to the main processing. The positional information contained in the "tap" event indicates coordinates of a single point specified by the tap operation. In the present exemplary embodiment, coordinate information of the touch start position identified by the identification unit 307 and stored in the RAM 201 in step S214, which will be described below, is used as the tap position.

In this manner, the processes of steps S208 to S213 after the preprocessing are a flow of processing for notifying the relevant application of the "release" event indicating that the user's hand/finger 103 stops touching the operation surface 101. If the instruction position does not move since the notification of the "touch" event until the notification of the "release" event, the recognition unit 308 notifies the relevant application of the "tap" event after notifying it of the "release" event, thereby conclusively determining that the operation performed by the user is the tap operation.

Next, suppose that the state determination unit 306 determines in step S205 that the operation surface 101 has been in the touch state already, and the processing proceeds to step S214. A flow in this case will be described below.

In step S214, the identification unit 307 detects a position at which the instruction position is estimated to stop moving while the touch state continues after the touch state starts, and identifies this position as the touch position. In the present exemplary embodiment, as described above, the instruction position is estimated to stop moving, if the difference between xy coordinates of instruction positions detected from infrared intensity images corresponding to consecutive two frames is smaller than the predetermined threshold value. Then, the coordinate information of the instruction position detected from the infrared intensity image corresponding to the latest frame is stored into the RAM 201. In the present exemplary embodiment, the identification unit 307 identifies a position at which the instruction position is estimated to stop moving for the first time since the touch starts, as the touch start position that indicates a position at which the user starts touching the operation surface 101 intentionally. This is an identification method utilizing the fact that the user's hand/finger 103 temporarily stops moving due to a friction or the like generated at the moment that the user's hand/finger 103 touches the operation surface 101. This method allows a position that the user touches actually to be identified as the touch start position, even if a position when the recognition object moves beyond the threshold value for the height is different from a position that the user touches intentionally. Further, if the position at which the instruction position is estimated to stop moving is detected a plurality of times while the touch state continues, the identification unit 307 stores this position into the RAM 201 each time. Then, at the time of the notification of the "release" event in step S211, a position detected last, among the positions stored in the RAM 201 at which the instruction position is estimated to stop moving, is identified as the touch end position. When the tap operation is performed, the touch start position and the touch end position may coincide with each other. Information that indicates that they are coordinates of the touch start position is stored in the RAM 201, together with the xy coordinates thereof. Similarly, information that indicates that they are coordinates of the touch end position is stored in the RAM 201, together with the xy coordinates thereof. If the identification unit 307 cannot detect a position at which the instruction position is estimated to stop moving in step S214, i.e., the user's hand/finger 103 keeps moving without stopping, the processing proceeds to step S215 while omitting the storage of the information of the touch position.

In step S215, the recognition unit 308 acquires the movement distance of the instruction position from the touch start position to the instruction position detected form the latest frame, and stores the acquired distance into the RAM 201. The recognition unit 308 calculates a shortest distance between the two points with use of the xy coordinates of the touch start position stored in the RAM 201 and the xy coordinates that indicate the latest instruction position identified in step S201. However, if the touch start position is not stored in the RAM 201, the recognition unit 308 calculates the distance between the two points with use of the xy coordinates of the proximity start position contained in the "touch" event of which the relevant application is notified in step S207, and the xy coordinates of the latest instruction position, as exceptional processing. This exceptional processing is performed to prevent the information processing apparatus 100 from becoming unable to continue the processing when the user performs the operation without stopping his/her hand/finger 103. Therefore, the information about the movement distance based on the proximity start position, which is acquired by the exceptional processing, is deleted after the touch start position is stored in the RAM 201.

In step S216, the recognition unit 308 determines whether the movement distance from the touch start position acquired in step S215 is a predetermined threshold value 3 or longer. The threshold value 3 is a threshold value for determining whether the user's hand/finger 103 is moved sufficiently in the xy directions while keeping touching the operation surface 101. In other words, the determination in step S216 is processing for distinguishing the tap operation and the move operation from each other. A value of the threshold value 3 is set so as to become sufficiently larger than a distance between the proximity start position and the touch start position in a normal touch operation. The threshold value 3 is set in this manner to prevent the movement distance acquired by the above-described exceptional processing from exceeding the threshold value 3 before the instruction position stops moving. Alternatively, it is also possible to prevent the movement distance from exceeding the threshold value 3 before the instruction position stops moving by setting a different threshold value as the threshold value to be compared with the movement distance acquired by the exceptional processing. If the recognition unit 308 determines that the movement distance from the touch start position is the predetermined threshold value 3 or longer (YES in step S216), the processing proceeds to step S218. On the other hand, if the recognition unit 308 determines that the movement distance from the touch start position is shorter than the predetermined threshold value 3 (NO in step S216), the processing proceeds to step S217. The information about the movement distance stored in the RAM 201 is deleted each time a determination result is produced in step S216.

In step S217, the recognition unit 308 generates the "tap" event, and stores the generated event into the RAM 201. The "tap" event generated at this time contains the information for notifying each functional unit that the tap operation is performed, and the coordinate information of the touch start position.

On the other hand, in step S218, the recognition unit 308 determines whether the "tap" event generated in step S217 has been stored in the RAM 201 already. At this time, because the movement distance of the instruction position in the touch state is the threshold value 3 or longer, it is conclusively determined that the operation performed by the user is not the tap operation. Therefore, in subsequent processing thereafter, the recognition unit 308 should notify the relevant application of information indicating that the move operation starts or continues being performed. If the recognition unit 308 determines that the "tap" event has been stored (YES in step S218), the processing proceeds to step S219. If the recognition unit 308 determines that the "tap" event has not been stored (NO in step S218), the processing proceeds to step S220.

In step S219, the recognition unit 308 changes the stored "tap" event to the "move start" event, and then notifies the relevant application of the "move start" event. The positional information contained in the "move start" event is the coordinate information of the touch start position.

On the other hand, in step S220, the recognition unit 308 notifies the relevant application of the "move" event, and then the present processing returns to the main processing. The positional information contained in the "move" event is also the information about the xy coordinates that indicate the latest instruction position.

In this manner, the processes of steps S214 to S220 after the preprocessing are a flow of processing for notifying the relevant application of the "move start" event and the "move" event indicating that the user's hand/finger 103 is moved with the touch state maintained. If notification of any one of the "move" event and the "move start" event has been performed, an end of the move operation is conclusively determined at the time of the notification of the "release" event later. In this case, the positional information contained in the "release" event is the information about the xy coordinates of the touch end position at which the instruction position is estimated to stop moving for the last time. However, if no position is detected as the position at which the instruction position is estimated to stop moving, the recognition unit 308 notifies the relevant application of information about xy coordinates of the proximity end position as exceptional processing. This processing is processing for preventing the information processing apparatus 100 from becoming unable to continue the processing when the user performs the operation without stopping his/her hand/finger 103, in a similar manner to the exceptional processing in step S215. In response to the notification of the "move start" event or the "move" event, in step S105, the display control unit 309 performs, for example, the processing for displacing the display item displayed at the touch start position to the latest instruction position.

In the present exemplary embodiment, the "tap" event generated in step S217 is kept stored in the RAM 201 as long as it is not changed to the "move start" event in step S219. Then, determining whether the "tap" event is stored in the RAM 201 in step S212 allows the tap operation and the move operation to be reliably distinguished from each other after the notification of the "release" event, although the tap operation and the move operation are difficult to be distinguished from each other while the touch state continues.

Next, specific flows of the processing when the tap operation and the move operation are performed on the information processing apparatus 100 according to the present exemplary embodiment will be described with reference to FIGS. 6A, 6B, and 6C, and 7A, 7B, and 7C.

Figure 6A:
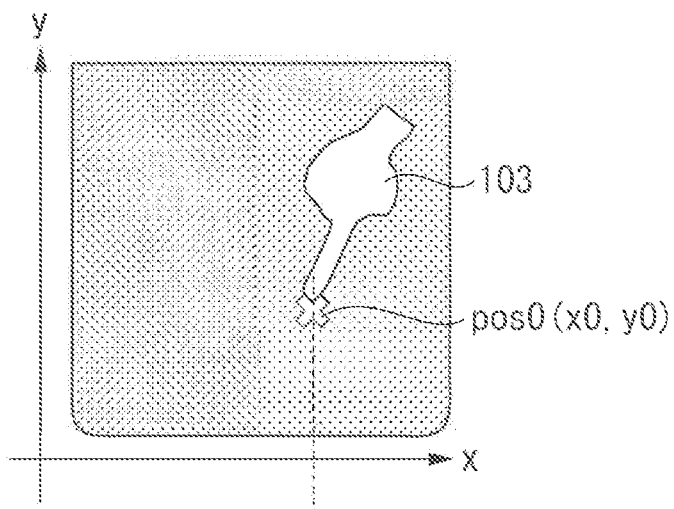
Figure 6B:
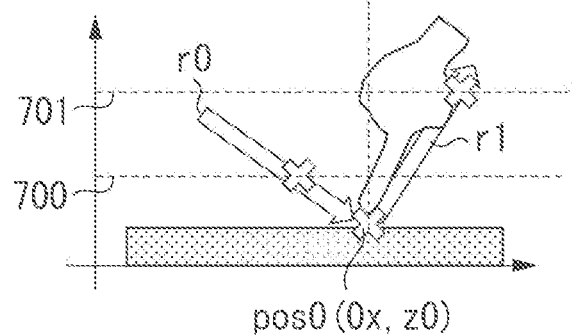

First, FIGS. 6A, 6B, and 6C illustrate the flow of the processing performed by the information processing apparatus 100 according to the present exemplary embodiment, and the tap position identified thereby when the tap operation is performed by the user. FIG. 6A illustrates the operation surface 101 (the xy plane) as viewed from above. In this drawing, the user's hand/finger 103 is about to specify the position Pos0 (x0, y0) by the tap operation. FIG. 6B illustrates how this tap operation is performed as viewed from the side (from the negative side of the y axis). FIGS. 6A and 6B illustrate that the user is moving his/her finger in the xy directions when performing the tap operation, in a similar manner to the illustration of FIGS. 3C and 3D. FIG. 6C illustrates a graph that indicates the vertical distance hL (Height) between the user's fingertip and the operation surface 101, which is acquired during the series of tap processes, and an inter-frame movement distance mL (moveLen), which indicates a difference in xy coordinates from a previous frame for each frame. In this graph, the horizontal axis represents a frame number. The value Height and the value moveLen are values acquired by the processes of steps S201 to S203, and the process of step S214, respectively.

Further, in FIG. 6C, the threshold value 1 used in the determination in step S204, and the threshold value 2 used in the determination in step S208 are indicated by broken lines 700 and 701, respectively. Suppose that the threshold values 1 and 2 are set to 20 mm and 50 mm, respectively, by way of example. In the present exemplary embodiment, different values are set as the threshold values 1 and 2 in this manner. Therefore, even if there is a variation in the instruction position detected by the position detection unit 302, this variation can be unaffected. In other words, a shift to the touch state can be determined when the user's fingertip sufficiently approaches the operation surface 101, and a shift to the non-touch state can be determined when the user's fingertip is separated sufficiently away from the operation surface 101. Further, FIG. 6B illustrates that the fingertip takes a route from r0 to r1 illustrated in FIG. 6B, when the user taps the position Pos0.

First, the user's fingertip passes the threshold value 1 indicated by the broken line 700. The vertical distance hL acquired at this time corresponds to a point 702 illustrated in FIG. 6C. Because the vertical distance hL is shorter than the threshold value 1 (YES in step S204), and the operation surface 101 has been in the non-touch state until this time (NO in step S205), in step S206, the touch determination flag is updated to "1", and then, in step S207, the relevant application is notified of the "touch" event.

Further, the user touches the operation surface 101, and taps the position Pos0. Because the user's fingertip touches the operation surface 101, the fingertip stops moving for an extremely short time period. At this time, the vertical distance hL is 0, and corresponds to a point 703 illustrated in FIG. 6C. Because the operation surface 101 has been in the touch state already (YES in step S205), in step S214, the inter-frame movement distance mL is acquired. The fingertip stops moving at this time so that 0 is detected as the inter-frame movement distance mL at the same time as the point 703, as illustrated in FIG. 6C. Therefore, in step S215, the position Pos0 (x0, y0) is identified as the touch start position. Because the instruction position is not moved (NO in step S216), in step S217, the "tap" event is generated, and is stored. The "tap" event contains the coordinates of the position Pos0 (x0, y0) at which the user's fingertip is estimated to stop moving for the first time in the touch state, as the tap position.

Then, the user moves his/her fingertip away from the operation surface 101, and the fingertip passes the threshold value 2 indicated by the broken line 701. The vertical distance hL acquired at this time corresponds to a point 704 illustrated in FIG. 6C. Because the vertical distance hL is longer than the threshold value 2 (YES in step S208), and the operation surface 101 has been in the touch state until this time (NO in step S209), in step S210, the touch determination flag is updated to "0". Then, in step S211, the relevant application is notified of the "release" event. Because the "tap" event generated in step S217 is stored in the RAM 201 (YES in step S212), in step S213, the relevant application is notified of the "tap" event that contains the tap position information. In response thereto, the display control unit 309 updates the projected image display. In this manner, in the present exemplary embodiment, even when the user moves his/her fingertip in a direction (in the xy plane) in parallel with the operation surface 101 before and/or after performing the tap operation, the position on the operation surface 101 that the user touches actually can be identified as the tap position. In the present exemplary embodiment, the tap position is defined by the position at which the user's fingertip is estimated to stop moving for the first time in the touch state (the touch start position). However, the tap position may be defined by the touch end position at which the user's fingertip is estimated to stop moving for the last time. In the tap operation, the touch start position and the touch end position substantially coincide with each other, whereby a similar effect can be acquired even if the touch end position is used as the tap position.

Figure 7A:
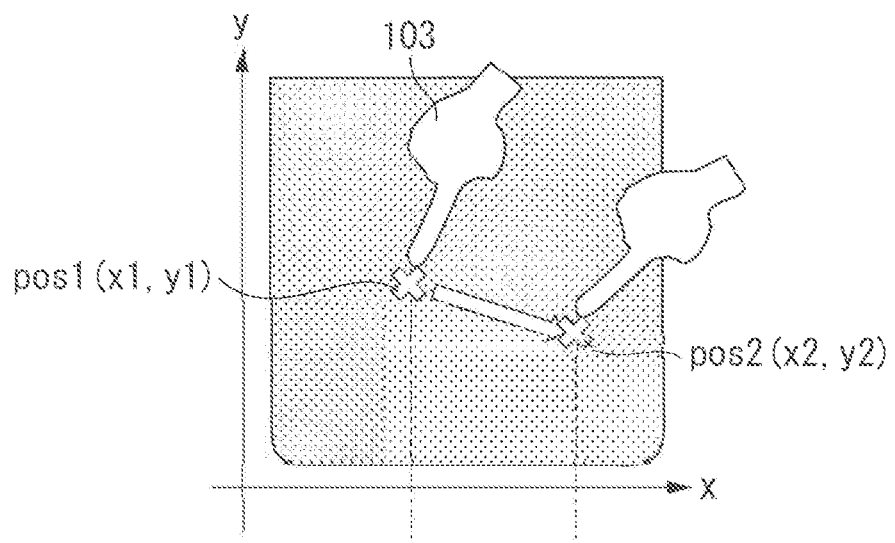
FIGS. 7A, 7B, and 7C illustrate an example of data acquired when a move operation is performed with use of the information processing apparatus.
Figure 7B:
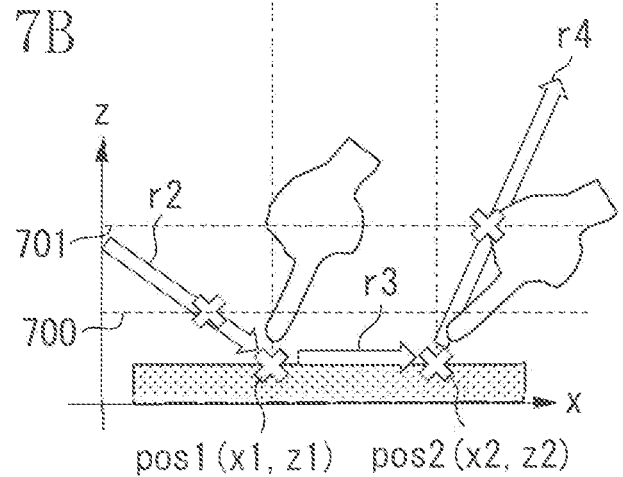
Figure 7C:
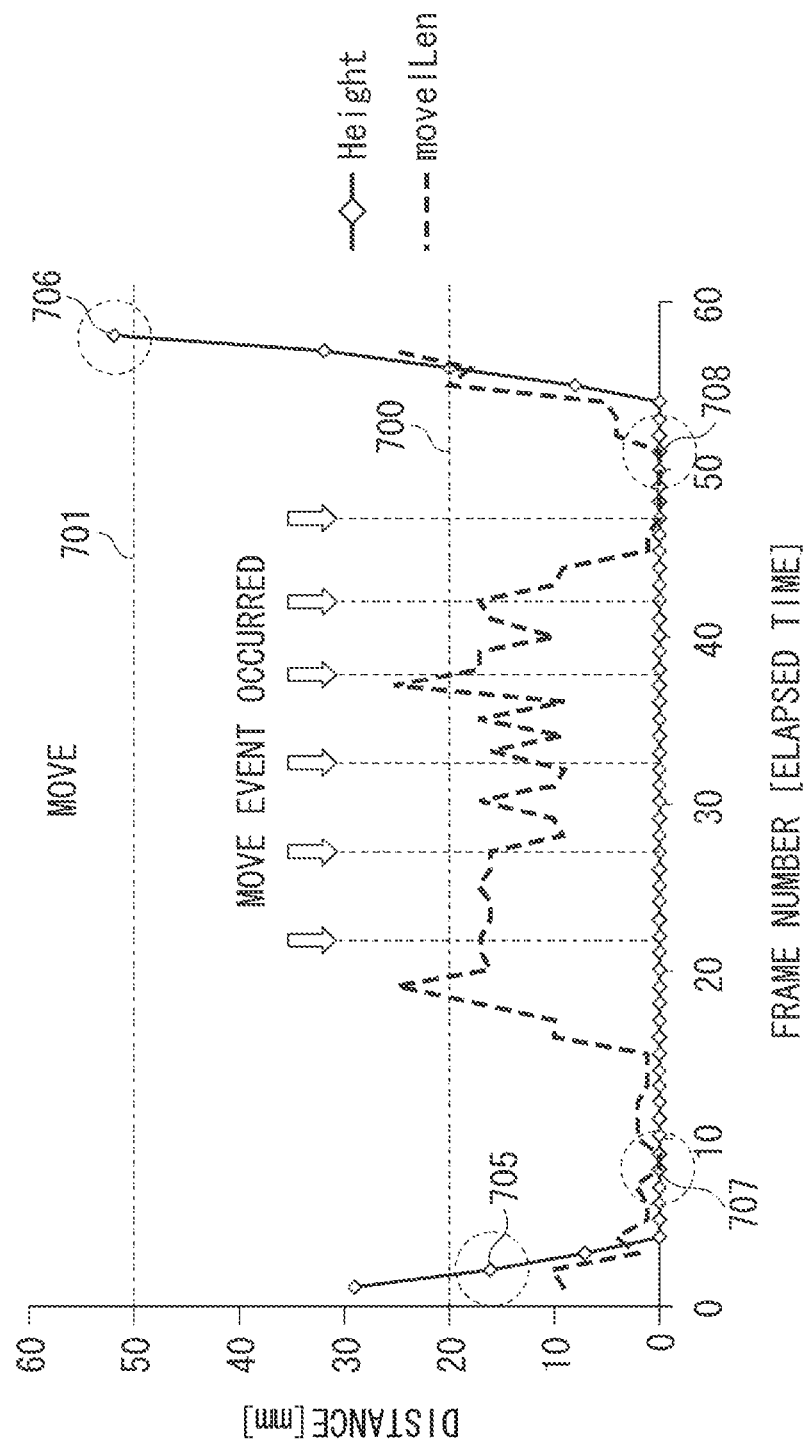

Next, FIGS. 7A, 7B, and 7C illustrate the flow of processing performed by the information processing apparatus 100 according to the present exemplary embodiment, and the identified start position and end position of the move operation, when the move operation is performed by the user. The positions, lines, and the others indicated by the same names and reference numerals as FIGS. 6A, 6B, and 6C are defined to mean the same contents as FIGS. 6A, 6B, and 6C. FIG. 7B illustrates that the user's fingertip takes a route from r2 to r3 to r4 when the user performs the move operation from Pos1 to Pos2. When the move operation is performed, first, the user's fingertip also passes the threshold value 1 indicated by the broken line 700. The vertical distance hL acquired at this time corresponds to a point 705 illustrated in FIG. 7C. In step S207, the relevant application is notified of the "touch" event at this stage by similar processing to the tap operation illustrated in FIGS. 6A, 6B, and 6C.

Further, the user touches the operation surface 101, and touches the position Pos1 (x1, y1). Because the user's fingertip touches the operation surface 101, the fingertip stops moving for an extremely short time period. At this time, the vertical distance hL is 0, and corresponds to a point 707 illustrated in FIG. 7C. In step S215, the position Pos1 (x1, y1) is identified as the touch start position in a similar manner to the tap operation illustrated in FIGS. 6A, 6B, and 6C. Because the instruction position is not moved yet (NO in step S216), in step S217, the "tap" event is generated, and is stored.

After that, the user moves his/her fingertip to the position Pos2 while keeping touching the operation surface 101. Even during the movement, the instruction position is detected for each frame, and the processing from the generation of the "tap" event to the shift to the waiting state is repeated until the distance from the touch start position to the latest instruction position exceeds the threshold value 3. If the movement distance from the touch start position exceeds the threshold value 3 (YES in step S216), in step S219, the stored "tap" event is changed into the "move start" event, and the relevant application is notified of the "move start" event. After that, in step S220, the relevant application is notified of the "move" event each time the instruction position is detected until the fingertip is released. The display control unit 309 performs the display control of, for example, displacing the display item while handling the latest instruction position as a move position. In the present exemplary embodiment, a relevant application is notified of an event for each frame acquired from the infrared camera 208, whereby the application can respond to the move operation with a maximum resolution. However, followability to the operation may be deteriorated depending on a condition of a processing load required for the display control or other conditions. Therefore, it is possible to improve the followability to the user's move operation while reducing the processing load imposed on the information processing apparatus 100 by reducing the frames in such a manner that they have appropriate intervals therebetween so that the processing is performed at every predetermined time. For example, FIG. 7C illustrates timings when the relevant application is notified of the move event at every five frames. The interval of the processing for notifying a relevant application of an event may be set according to the content of the graphical user interface handled by the information processing apparatus 100 and the processing capability.

In the present exemplary embodiment, the position at which the user's fingertip stops moving for the last time is identified as the end position of the touch input. This is a method utilizing such a tendency that the user's fingertip stops moving for an extremely short time period when the user is deciding where to end the move operation. Therefore, the xy coordinates Pos2 (x2, y2) of the instruction position detected when the fingertip ends the move operation at the position Pos2 correspond to a point 708 illustrated in FIG. 7C, where both the vertical distance hL and the movement distance mL between frames are almost 0. In the present exemplary embodiment, the relevant application is notified of the position Pos2 (x2, y2) at which the user's fingertip stops moving for the last time as the end position of the move operation, together with the "release" event.

Lastly, the user moves his/her finger away from the operation surface 101, by which the fingertip passes the threshold value 2 indicated by the broken line 701. The vertical distance hL acquired at this time corresponds to a point 706 illustrated in FIG. 7C. Because the vertical distance hL is longer than the threshold value 2 (YES in step S208), and the operation surface 101 has been in the touch state until this time (NO in step S209), in step S210, the touch determination flag is updated to "0". Then, in step S211, the relevant application is notified of the "release" event. Because the "tap" event is not stored any longer (NO in step S212), an end of the move operation is conclusively determined. The display control unit 309 ends the response to the move operation.

In this manner, in the present exemplary embodiment, the start position and end position of the touch input are identified with use of the tendency of the user's fingertip stopping moving when starting and ending the touch. Therefore, even when a target to be touched is an arbitrary plane and whether the target is touched is determined by preparing the threshold value for the distance between this plane and the user's fingertip, it is possible to improve the accuracy of detection of the touch position (the start position and the end position of the touch input). The tendency of the user's fingertip stopping moving when starting and ending the touch occurs without user's intention to do that, and therefore does not always occur. Further, the time period during which the fingertip stops moving is not necessarily a time period suitable to the resolution for the detection, either. Therefore, in the present exemplary embodiment, when the position at which the user's fingertip is estimated to stop moving cannot be detected, a section from the proximity start position (corresponding to the point 705) to the proximity end position (corresponding to the point 706) is complementarily used as a section where the move operation is performed. Therefore, even when the position at which the user's fingertip stops moving cannot be detected, this does not lead to the inability to detect the move operation. Therefore, even if the user does not stop his/her finger unintentionally, this does not result in occurrence of such inconvenience that it suddenly becomes impossible to perform the move operation.

Further, during a time period since the shift of the information processing apparatus 100 from the non-touch state into the touch state until the first stop of the fingertip, and during a time period since the last stop of the fingertip until the shift of the information processing apparatus 100 from the touch state into the non-touch state, the fingertip is kept detected as the "fingertip located in proximity to the operation surface 101". Generally, an operation performed by the recognition object located in proximity to the operation surface 101 is referred to as a hover operation (a floating operation). In the present exemplary embodiment, it is possible to recognize the hover operation by utilizing a movement of the "fingertip located in proximity to the operation surface 101", thereby further improving the operability of the information processing apparatus 100. More specifically, it is possible to determine that the hover operation has started in response to notification of the "touch" event. Therefore, for example, it is possible to change a size of a specific display item and focus on this item based on the positional information of the proximity start position contained in the "touch" event to thereby facilitate a touch operation to be performed after that, and the like.

In the above-described present exemplary embodiment, the recognition unit 308 notifies the relevant application of the information about the position at which the instruction position is estimated to stop moving for the first time only after conclusively determining which event the relevant application should be notified of, the "tap" event or the "move start" event. However, the recognition unit 308 may first notify the relevant application of the information about the tap position without waiting for the conclusive determination of the event. For example, if an operation to be recognized is an operation as a combination of the hover operation and the touch operation, it becomes possible to provide an operation environment with further improved followability by notifying each relevant functional unit of the positional information immediately after the position at which the instruction position is estimated to stop moving for the first time is identified.

Further, in the present exemplary embodiment, the three-dimensional position of the user's hand/finger 103 is acquired with use of the infrared emission unit 207 and the infrared camera 208. However, this information can be also acquired by using a stereo camera or a range image sensor. The method for performing the touch determination based on the proximity state between the recognition object and the operation surface 101 does not necessarily have to rely on the determination of the distance based on the three-dimensional position, and this may be replaced with a determination based on a result of detection about how close the user's hand/finger 103 approaches the operation surface 101 with use of, for example, a thermosensitive sensor or a capacitance sensor. Further, the present exemplary embodiment has been described based on the example in which the surface projected by the projector 209 is used as the operation surface 101 for the touch operation. However, the present exemplary embodiment can be applied even when a head-mounted display is employed and a virtual surface in an AR space or an MR space (for example, a surface of a virtually displayed object) is used as the operation surface 101.

In the above-described first exemplary embodiment, an operation that should be performed is uniquely identified for the functional unit receiving the event information by using the five types of touch events, "touch", "release", "tap", "move start", and "move". On the other hand, a modification simplifying the processing by reducing the number of handled events will be described now. In the following description, the modification will be described in detail with reference to the drawings. Components similar to those described in the first exemplary embodiment will be identified by the same reference numerals, and descriptions thereof will be omitted as necessary.

The information processing apparatus 100 according to the modification has a hardware configuration and a functional configuration similar to the first exemplary embodiment. However, in the modification, the recognition unit 308 notifies a relevant application of only three types of touch events "touch", "release", and "move". In the modification, the positional information contained in the "touch" event serves as the coordinate information that indicates the tap event. In other words, a functional unit relating to a response by the application, such as the display control unit 309, responds by interpreting that the tap operation is input when it is notified of the "touch" event and the "release" event consecutively. Further, the functional unit responds by interpreting that the move operation is continuously input until it is notified of the "release" event, when it is notified of the "move" event immediately after notification of the "touch" event.

Processing for recognizing the touch operation, which is performed by the information processing apparatus 100 according to the modification, is performed according to the flowchart illustrated in FIG. 4 in a similar manner to the first exemplary embodiment. However, in the modification, the touch determination processing in step S104 is performed according to a flowchart illustrated in FIGS. 8A and 8B.

Figure 5B:
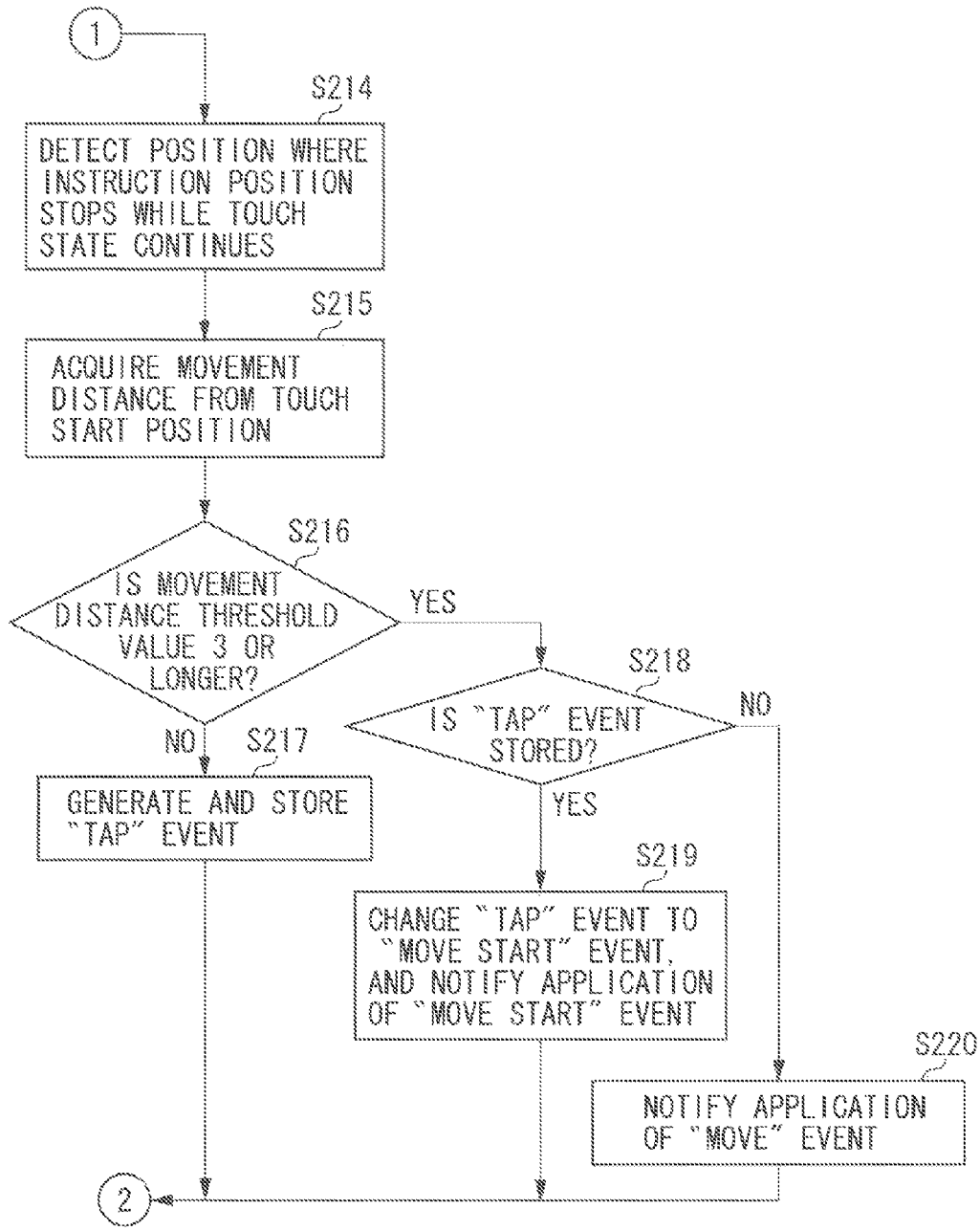
Figure 8B:
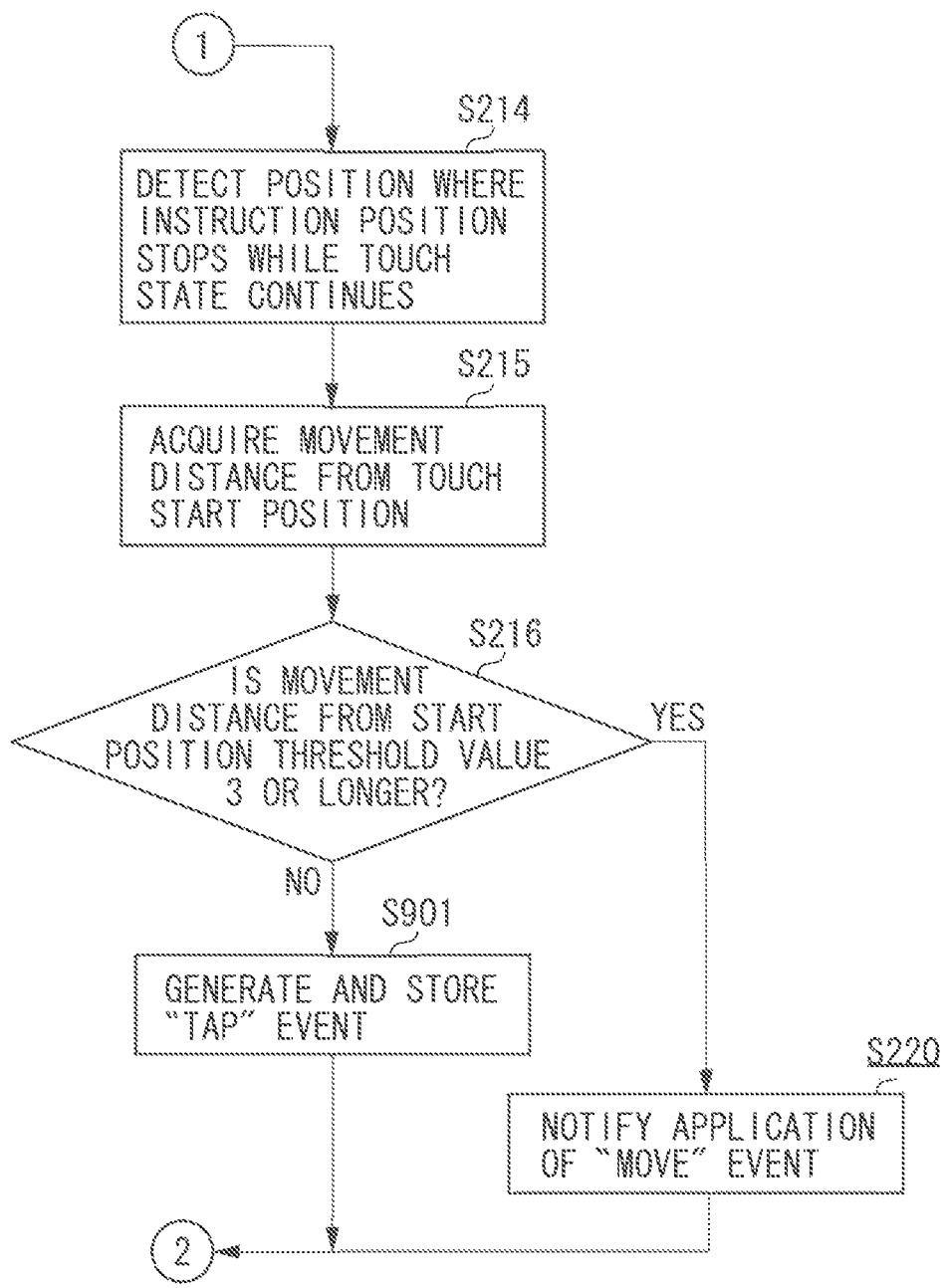

The flowchart illustrated in FIGS. 8A and 8B is similar to the flowchart illustrated in FIGS. 5A and 5B during the preprocessing. On the other hand, differences of the flowchart illustrated in FIGS. 8A and 8B from the flowchart illustrated in FIGS. 5A and 5B are that the processes of steps S212, S213, S217, S218, and S219 are omitted, and processes of steps S900 and S901 are added. In the following description, the flowchart illustrated in FIGS. 8A and 8B will be described in detail, especially focusing on the differences from FIGS. 5A and 5B.

In the modification, after the completion of the preprocessing, in step S204, the state determination unit 306 determines whether the vertical distance hL is the threshold value 1 or shorter. If the state determination unit 306 determines that the vertical distance hL is the threshold value 1 or shorter (YES in step S204), the processing proceeds to step S205, in which the state determination unit 306 determines whether the operation surface 101 has been in the touch state already. Then, if the state determination unit 306 determines that the operation surface 101 has not been in the touch state until this time, i.e., the operation surface 101 has been in the non-touch state until this time (NO in step S205), in step S206, the state determination unit 306 updates the touch determination flag to "1". Then, the processing proceeds to step S900.

In step S900, the recognition unit 308 stores the information about the instruction position detected from the latest frame into the RAM 201, and the present processing returns to the main processing. Unlike the first exemplary embodiment, the relevant application is not notified of the "touch" event at this stage.

On the other hand, if the state determination unit 306 determines that the vertical distance hL is longer than the threshold value 1 (NO in step S204), the processing proceeds to step S208, in which the state determination unit 306 determines whether the vertical distance hL is the threshold value 2 or longer. If the state determination unit 306 determines that the vertical distance hL is the threshold value 2 or longer (YES in step S208), the processing proceeds to step S209, in which the state determination unit 306 determines whether the information processing apparatus 100 has been in the non-touch state already. Then, if the state determination unit 306 determines that the information processing apparatus 100 has not been in the non-touch state until this time, i.e., the information processing apparatus 100 has been in the touch state until this time (NO in step S209), in step S210, the state determination unit 306 updates the touch determination flag to "0". In step S211, the recognition unit 308 notifies the relevant application of the "release" event. In the modification, the positional information contained in the "release" event is the positional information that indicates the touch end position. Upon receiving the notification of the "release" event, the display control unit 309 interprets that the tap operation is input if the event received immediately before that is the "touch" event, and controls the display based on the tap position information contained in the "touch" event. On the other hand, if the event received immediately before that is the "move" event, the display control unit 309 controls the display based on the positional information, using the touch end position contained in the "release" event as the end position of the move operation.

On the other hand, if the state determination unit 306 determines in step S205 that the information processing apparatus 100 has been in the touch state already (YES in step S205), in step S214, the identification unit 307 identifies the position at which the instruction position is estimated to stop moving while the touch state continues. In step S215, the recognition unit 308 acquires the movement distance of the instruction position from the touch start position to the instruction position detected from the latest frame. In step S216, the recognition unit 308 determines whether the movement distance is the predetermined threshold value 3 or longer. In the modification, if the recognition unit 308 determines that the movement distance from the touch start position is shorter than the predetermined threshold value 3 (NO in step S216), the processing proceeds to step S901.

In step S901, the recognition unit 308 notifies the relevant application of the "touch" event. In this manner, in the modification, the relevant application is notified of the "touch" event at a different timing from that of the first exemplary embodiment. The positional information contained in the "touch" event at this time is the xy coordinate information of the touch start position, which is the position where the instruction position is estimated to stop moving for the first time while the touch state continues. In step S901, the relevant application is notified of the information about this touch start position as the information that indicates the tap position. In this manner, in the modification, omission of the "tap" event is realized by addition of the information about the tap position to the "touch" event.

On the other hand, if the recognition unit 308 determines that the movement distance from the touch start position is the predetermined threshold value 3 or longer (YES in step S216), in step S220, the recognition unit 308 notifies the relevant application of the "move" event. The positional information contained in the "move" event is the information about the xy coordinates that indicate the latest instruction position. In the modification, the information about the tap position (the touch start position) contained in the "touch" event indicates the start position of the move operation. Therefore, when being notified of the "move" event immediately after the "touch" event, the display control unit 309 interprets that the information about the tap position contained in the "touch" event is the move start position in response to this notification. Accordingly, the "move start" event can be omitted.

In this manner, in the modification, the tap operation and the move operation are distinguished from each other according to the order of notification of the three types of events, i.e., "touch", "release", and "move", whereby the event processing is simplified. Further, in a similar manner to the first exemplary embodiment, the identification unit 307 identifies the start position and the end position of the touch input by utilizing the tendency of the user's fingertip stopping moving when starting and ending the touch. Therefore, it is possible to improve the accuracy of detection of the start position and the end position of the touch operation, even when a target to be touched is an arbitrary plane, and whether the target is touched is determined by preparing the threshold value for the distance between this plane and the user's fingertip.

According to the present disclosure, it is possible to improve the accuracy of detection of the touch start position in the touch operation recognized based on the proximity state between the recognition object and the touch target surface.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-174678 filed Aug. 26, 2013, which is hereby incorporated by reference herein in its entirety.

What is claimed is:

1. An information processing apparatus configured to recognize a touch of a recognition object onto an operation surface based on a proximity state between the operation surface and the recognition object, the information processing apparatus comprising at least one processor coupled to at least one memory, the at least one processor being programmed to function as:
   a position detection unit configured to detect an instruction position indicated by the recognition object;
   a state determination unit configured to determine that the operation surface is in a state touched by the recognition object during a time period since a distance between the operation surface and the recognition object falls below a first threshold value until the distance exceeds a second threshold value; and
   an identification unit configured to identify a position at which the instruction position detected by the position detection unit is estimated to stop moving while the state determination unit keeps determining that the operation surface is in the state touched by the recognition object during the time period since the distance between the operation surface and the recognition object falls below the first threshold value until the distance exceeds the second threshold value, as a position touched by the recognition object.

2. The information processing apparatus according to claim 1, wherein the identification unit identifies a position at which the instruction position detected by the position detection unit is estimated to stop moving for the first time during the time period since the distance between the operation surface and the recognition object falls below the first threshold value until the distance exceeds the second threshold value, as a touch position when a touch input starts.

3. The information processing apparatus according to claim 2, wherein the identification unit identifies a position at which the instruction position detected by the position detection unit is estimated to stop moving for the last time during the time period since the distance between the operation surface and the recognition object falls below the first threshold value until the distance exceeds the second threshold value, as a touch position when the touch input ends.

4. The information processing apparatus according to claim 3, further comprising a recognition unit configured to recognize that a tap operation is input, if the position identified by the identification unit as the touch position when the touch input starts, and the position identified by the identification unit as the touch position when the touch input ends coincide with each other.

5. The information processing apparatus according to claim 4, wherein the recognition unit recognizes that a move operation starts, if a distance between the position identified by the identification unit as the touch position when the touch input starts, and the position identified by the identification unit as the touch position when the touch input ends is longer than a predetermined threshold value.

6. The information processing apparatus according to claim 5, further comprising a display control unit configured to control an image to be displayed on the operation surface, wherein the display control unit displaces a display item displayed at the position identified by the identification unit as the touch position when the touch input starts, to the position identified by the identification unit as the touch position when the touch input ends, if the recognition unit recognizes that the move operation starts.

7. The information processing apparatus according to claim 4, wherein the recognition unit recognizes that a move operation starts, if the position identified by the identification unit as the touch position when the touch input starts, and the position identified by the identification unit as the touch position when the touch input ends do not coincide with each other.

8. The information processing apparatus according to claim 4, further comprising a display control unit configured to control an image to be displayed on the operation surface, wherein the display control unit displays an image corresponding to a display item displayed at the touch position when the touch input starts, which is identified by the identification unit, on the operation surface, if the recognition unit recognizes that the tap operation is input.

9. The information processing apparatus according to claim 1, wherein the second threshold value is larger than the first threshold value.

10. The information processing apparatus according to claim 1, wherein the identification unit further identifies a position at which the distance between the operation surface and the recognition object falls below the first threshold value as a start position of a hover operation by the recognition object, and identifies a position at which the distance between the operation surface and the recognition object exceeds the second threshold value as an end position of the hover operation by the recognition object.

11. The information processing apparatus according to claim 1, further comprising a region detection unit configured to detect a movement region where the recognition object exists from an input image captured by an imaging unit, wherein the position detection unit detects the instruction position indicated by the recognition object based on a shape of the movement region detected by the region detection unit.

12. The information processing apparatus according to claim 11, wherein the imaging unit is an infrared camera configured to detect infrared light, and the input image is information including a luminance value of the infrared light detected by the infrared camera.

13. The information processing apparatus according to claim 1, wherein the second threshold value is larger than the first threshold value.

14. The information processing apparatus according to claim 1, wherein the first threshold value is equal to the second threshold value.

15. A method for controlling an information processing apparatus configured to recognize a touch of a recognition object onto an operation surface based on a proximity state between the operation surface and the recognition object, the method comprising:

detecting an instruction position indicated by the recognition object;

determining that the operation surface is in a state touched by the recognition object during a time period since a distance between the operation surface and the recognition object falls below a first threshold value until the distance exceeds a second threshold value; and identifying a position at which the detected instruction position is estimated to stop moving while the determining keeps determining that the operation surface is in the state touched by the recognition object during the time period since the distance between the operation surface and the recognition object falls below the first threshold value until the distance exceeds the second threshold value, as a position touched by the recognition object.

16. A non-transitory computer-readable storage medium storing a program which, when read and executed by at least one processor in a computer, causes the computer to function as each unit of an information processing apparatus configured to recognized a touch of a recognition object onto a operation surface based on a proximity state between the operation surface and the recognition object, the information processing apparatus comprising:

a position detection unit configured to detect and instruction position indicated by the recognition object;

a state determination unit configured to determine that the operation surface is in a state touched by the recognition object during a time period since a distance between the operation surface and the recognition object falls below a first threshold value until the distance exceeds a second threshold value; and an identification unit configured to identify a position at which the instruction position detected by the position detection unit is estimated to stop moving while the state determination unit keeps determining that the operation surface is in the state touched by the recognition object during the time period since the distance between the operation surface and the recognition object falls below the first threshold value until the distance exceeds the second threshold value, as a position touched by the recognition object.

* * * * *